US012562808B2

(12) United States Patent
Liu et al.

(10) Patent No.: US 12,562,808 B2
(45) Date of Patent: Feb. 24, 2026

(54) METHOD FOR DETERMINING SEGMENTATION POINT OF DIGITAL PROCESSING OPERATION AND APPARATUS

(71) Applicant: Huawei Technologies Co., Ltd., Shenzhen (CN)

(72) Inventors: Peng Liu, Shenzhen (CN); Guangjian Wang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 613 days.

(21) Appl. No.: 18/066,013

(22) Filed: Dec. 14, 2022

(65) Prior Publication Data

US 2023/0116714 A1 Apr. 13, 2023

Related U.S. Application Data

(63) Continuation of application No. PCT/CN2021/099845, filed on Jun. 11, 2021.

(30) Foreign Application Priority Data

Jun. 15, 2020 (CN) .......................... 202010544684.7

(51) Int. Cl.
*H04B 7/185* (2006.01)
*H04W 84/06* (2009.01)
(52) U.S. Cl.
CPC ..... *H04B 7/18513* (2013.01); *H04B 7/18532* (2013.01); *H04W 84/06* (2013.01)
(58) Field of Classification Search
CPC ............ H04B 7/18513; H04B 7/18532; H04B 10/118; H04B 7/185; H04B 7/18519; H04W 84/06; H04W 24/02
See application file for complete search history.

(56) References Cited

U.S. PATENT DOCUMENTS 4,827,268 A * 5/1989 Rosen ...................... H01Q 3/40
                                                    342/356
5,543,813 A * 8/1996 Araki .................... G01S 13/878
                                                    455/12.1
5,548,801 A * 8/1996 Araki ...................... G01S 19/38
                                                    455/13.1

(Continued)

FOREIGN PATENT DOCUMENTS

CN          102571188 A     7/2012

OTHER PUBLICATIONS

3GPP TR 38.801 V14.0.0, "3rd Generation Partnership Project; Technical Specification Group Radio Access Network; Study on new radio access technology: Radio access architecture and interfaces (Release 14)", Mar. 2017, total 91 pages.

*Primary Examiner* — Dominic E Rego
(74) *Attorney, Agent, or Firm* — Slater Matsil, LLP

(57) ABSTRACT

Embodiments of this application provide a method for determining a segmentation point of a digital processing operation and an apparatus, and relate to the field of satellite communication. The method is applied to a mobile satellite communication system. The mobile satellite communication system includes a first communication apparatus and a second communication apparatus. The method includes: The first communication apparatus obtains a type of a cell corresponding to a first beam, and determines, based on the type of the cell, a target segmentation point that is of a digital processing operation between the first communication apparatus and the second communication apparatus that is corresponding to the cell. The first beam is any one of a plurality of beams of the satellite, and the type of the cell is determined based on location information of the cell.

20 Claims, 17 Drawing Sheets

(56)        References Cited

U.S. PATENT DOCUMENTS

| | | | | |
|---|---|---|---|---|
| 5,768,266 | A * | 6/1998 | Thompson | H04B 7/18539 |
| | | | | 370/347 |
| 5,969,669 | A * | 10/1999 | Ishikawa | H04B 7/18547 |
| | | | | 342/357.78 |
| 5,974,092 | A * | 10/1999 | Roos | H04B 7/18534 |
| | | | | 455/13.1 |
| 6,064,858 | A * | 5/2000 | Maatman | H04B 7/18517 |
| | | | | 455/12.1 |
| 6,233,451 | B1 * | 5/2001 | Noerpel | H04B 7/1858 |
| | | | | 455/427 |
| 6,418,147 | B1 * | 7/2002 | Wiedeman | H04B 7/18532 |
| | | | | 370/468 |
| 6,920,309 | B1 * | 7/2005 | Yung | G01S 13/878 |
| | | | | 455/430 |
| 10,165,476 | B1 * | 12/2018 | Yan | H04W 36/08 |
| 2001/0000167 | A1 * | 4/2001 | Chang | H04B 7/18534 |
| | | | | 455/12.1 |

| | | | | |
|---|---|---|---|---|
| 2002/0098802 | A1 * | 7/2002 | Karabinis | H04B 7/18563 |
| | | | | 455/12.1 |
| 2002/0106041 | A1 * | 8/2002 | Chang | H04L 1/02 |
| | | | | 375/347 |
| 2003/0208317 | A1 * | 11/2003 | Chang | H04B 7/18532 |
| | | | | 342/357.48 |
| 2010/0128656 | A1 * | 5/2010 | Kim | H04W 72/0453 |
| | | | | 370/316 |
| 2013/0141275 | A1 * | 6/2013 | Abraham | G01S 19/37 |
| | | | | 342/357.23 |
| 2014/0348008 | A1 * | 11/2014 | Li | H04W 76/11 |
| | | | | 370/252 |
| 2016/0345189 | A1 * | 11/2016 | Miyagawa | H04W 72/0446 |
| 2017/0336512 | A1 * | 11/2017 | Kadelka | G01S 19/073 |
| 2018/0098247 | A1 * | 4/2018 | Gopal | H04B 7/18519 |
| 2018/0109003 | A1 * | 4/2018 | Arcidiacono | H04H 20/74 |
| 2018/0241464 | A1 * | 8/2018 | Michaels | H04B 7/18539 |
| 2019/0052351 | A1 * | 2/2019 | Fujimura | H04B 7/2041 |
| 2019/0090141 | A1 * | 3/2019 | Fujii | H04W 16/14 |

* cited by examiner

METHOD FOR DETERMINING SEGMENTATION POINT OF DIGITAL PROCESSING OPERATION AND APPARATUS

CROSS-REFERENCE TO RELATED APPLICATIONS

This application is a continuation of International Application No. PCT/CN2021/099845, filed on Jun. 11, 2021, which claims priority to Chinese Patent Application No. 202010544684.7, filed on Jun. 15, 2020. The disclosures of the aforementioned applications are hereby incorporated by reference in their entireties.

TECHNICAL FIELD

This application relates to the field of satellite communication, and in particular, to a method for determining a segmentation point of a digital processing operation and an apparatus.

BACKGROUND

In a communication system, a terrestrial mobile communication network has a limited coverage capability. For example, it is extremely difficult for the terrestrial mobile communication network to cover a place such as a remote area, a desert, a sea, or the air. Therefore, the terrestrial mobile communication network currently cannot meet a user requirement of obtaining information at any time and any place. To meet the foregoing requirement, a satellite may be used as an information access point. A system that provides a communication service by using the satellite as an access point is referred to as a mobile satellite communication system. The mobile satellite communication system provides wide-area coverage by using a plurality of beams. In this way, a network provided by the mobile satellite communication system can cover the place that the terrestrial mobile communication network fails to cover.

Currently, there are two architectures for the mobile satellite communication system. In a first architecture, the satellite has no digital signal processing capability. To be specific, the satellite cannot perform a digital processing operation on a received signal, but directly amplifies the received signal and forwards the received signal to a terrestrial station. After receiving the signal that is amplified and forwarded by the satellite, the terrestrial station performs a digital processing operation on the signal that is amplified and forwarded by the satellite, and returns a processing result to the satellite. In a second architecture, the satellite has a specific digital signal processing capability. In other words, the satellite can perform a digital processing operation on a received signal. In one case, the satellite performs a complete digital processing operation on the received signal. In another case, the satellite can segment a complete digital processing operation, so that the satellite performs a part of the digital processing operation, and the terrestrial station performs the other part of the digital processing operation.

In the second architecture, the satellite either does not send a signal to the terrestrial station or sends a signal that is not digitally processed by the satellite to the terrestrial station, and a delay is lower than a case in which the satellite sends all signals to the terrestrial station for processing in the first architecture. Therefore, the second architecture is increasingly widely used in the mobile satellite communication system. However, how to segment the digital processing operation in the second architecture also becomes a problem to be urgently resolved currently.

SUMMARY

Embodiments of this application provide a method for determining a segmentation point of a digital processing operation and an apparatus, and a segmentation point of a digital processing operation between a satellite and a terrestrial station may be determined based on a type of a cell corresponding to a satellite beam, so that the satellite and the terrestrial station perform digital processing operations based on the determined segmentation point.

To achieve the foregoing objectives, the following technical solutions are used in embodiments of this application.

According to a first aspect, an embodiment of this application provides a method for determining a segmentation point of a digital processing operation. The method is applied to a mobile satellite communication system, and the mobile satellite communication system includes a first communication apparatus and a second communication apparatus. The first communication apparatus is a satellite, and the second communication apparatus is a terrestrial station; or the first communication apparatus is a terrestrial station, and the second communication apparatus is a satellite. The method includes: The first communication apparatus obtains a type of a cell corresponding to a first beam, where the first beam is any one of a plurality of beams of the satellite, and the type of the cell is determined based on location information of the cell; and the first communication apparatus determines, based on the type of the cell, a target segmentation point corresponding to the cell, where the target segmentation point is a target segmentation point of a digital processing operation between the first communication apparatus and the second communication apparatus.

According to the method provided in the first aspect, the first communication apparatus may obtain the type of the cell corresponding to the first beam, and determine, based on the type of the cell, the target segmentation point that is of the digital processing operation between the first communication apparatus and the second communication apparatus and that is corresponding to the cell. In this way, for data of the cell, the first communication apparatus may exchange data with the second communication apparatus based on the target segmentation point, and the first communication apparatus and the second communication apparatus jointly complete the digital processing operation. In addition, the first communication apparatus includes a plurality of beams, and a terminal in a cell corresponding to each beam has a different requirement, and therefore, a segmentation point of a digital processing operation corresponding to the cell corresponding to each beam may also be different. In the method provided in the first aspect, the first communication apparatus may determine a target segmentation point for the cell corresponding to each beam, so that each cell performs communication by using a corresponding target segmentation point, to meet a requirement of a terminal in each cell.

In a possible implementation, the first communication apparatus sends information about the target segmentation point to the second communication apparatus, and the information about the target segmentation point is used to indicate the target segmentation point. Based on the foregoing method, after determining the target segmentation point, the first communication apparatus may notify the second communication apparatus of the target segmentation point, so that the second communication apparatus determines the target segmentation point that is of the digital processing operation between the first communication apparatus and the second communication apparatus and that is corresponding to the cell.

In a possible implementation, the target segmentation point is different from a current segmentation point that is of the digital processing operation between the first communication apparatus and the second communication apparatus and that is corresponding to the cell, and the method further includes: The first communication apparatus changes the current segmentation point to the target segmentation point; the first communication apparatus sends a first complete message to the second communication apparatus, where the first complete message is used to indicate that the first communication apparatus has changed the current segmentation point to the target segmentation point; and the first communication apparatus receives a second complete message from the second communication apparatus, where the second complete message is used to indicate that the second communication apparatus has changed the current segmentation point to the target segmentation point. Based on the foregoing method, when a segmentation point that is of the digital processing operation between the first communication apparatus and the second communication apparatus and that is corresponding to the cell changes, the first communication apparatus may change the segmentation point that is of the digital processing operation between the first communication apparatus and the second communication apparatus and that is corresponding to the cell to a latest determined segmentation point, and notify the second communication apparatus that the first communication apparatus has successfully performed changing. Similarly, the second communication apparatus may change the segmentation point that is of the digital processing operation between the first communication apparatus and the second communication apparatus and that is corresponding to the cell to the latest determined segmentation point, and notify the first communication apparatus that the second communication apparatus has successfully performed changing. In this way, the first communication apparatus and the second communication apparatus may communicate with each other by using the latest determined segmentation point.

In a possible implementation, the type of the cell includes an internet of things (IoT) cell, a high-speed cell, an access point cell, or a hotspot cell. Based on the foregoing method, the type of the cell corresponding to the first beam may include the foregoing types. In this way, the first communication apparatus may determine a segmentation point for the IoT cell, the high-speed cell, the access point cell, and the hotspot cell, to meet requirements of different types of cells and improve user experience.

In a possible implementation, the first communication apparatus is a satellite, the second communication apparatus is a terrestrial station, the type of the cell is a hotspot cell, and the method further includes: The first communication apparatus receives measurement information from a terminal, where the terminal is a terminal in the cell, and the measurement information is used to indicate quality of a channel between the first communication apparatus and the terminal; the first communication apparatus sends the measurement information to the second communication apparatus; the first communication apparatus receives feedback information of the measurement information from the second communication apparatus; and the first communication apparatus communicates with the terminal based on the feedback information of the measurement information. Based on the foregoing method, the satellite may receive the measurement information from the terminal, and send the measurement information from the terminal to the terrestrial station. The satellite may further receive feedback information of the measurement information from the terrestrial station, and communicate with the terminal based on the feedback information of the measurement information. The measurement information may be used to indicate quality of a channel between the satellite and the terminal. In this way, the satellite may adjust a communication parameter between the satellite and the terminal based on the quality of the channel between the satellite and the terminal, so that network performance and transmission efficiency can be improved.

In a possible implementation, the feedback information of the measurement information is used to adjust the first beam; or the feedback information of the measurement information is used to schedule a terminal in the cell. Based on the foregoing method, the satellite may adjust the first beam based on the feedback information of the measurement information, so that the first beam is targeted at the terminal; or the satellite may schedule, based on the feedback information of the measurement information, the terminal in the cell corresponding to the first beam. In this way, network performance and transmission efficiency can be improved.

According to a second aspect, an embodiment of this application provides a method for determining a segmentation point of a digital processing operation. The method is applied to a mobile satellite communication system, and the mobile satellite communication system includes a first communication apparatus and a second communication apparatus. The first communication apparatus is a satellite, and the second communication apparatus is a terrestrial station; or the first communication apparatus is a terrestrial station, and the second communication apparatus is a satellite. The method includes: The second communication apparatus receives information about a target segmentation point from the first communication apparatus, where the information about the target segmentation point is used to indicate a target segmentation point corresponding to a cell, the cell is a cell corresponding to a first beam, the first beam is any one of a plurality of beams of the satellite, and the target segmentation point is a target segmentation point of a digital processing operation between the first communication apparatus and the second communication apparatus; and the second communication apparatus determines the target segmentation point based on the information about the target segmentation point.

According to the method provided in the second aspect, the second communication apparatus may receive the information about the target segmentation point from the first communication apparatus, and determine, based on the information about the target segmentation point, the target segmentation point that is of the digital processing operation between the first communication apparatus and the second communication apparatus and that is corresponding to the cell corresponding to the first beam. In this way, for data of the cell, the second communication apparatus may exchange data with the first communication apparatus based on the target segmentation point, and the second communication apparatus and the first communication apparatus jointly complete the digital processing operation. In addition, the first communication apparatus includes a plurality of beams, and a terminal in a cell corresponding to each beam has a different requirement, and therefore, a segmentation point of a digital processing operation corresponding to the cell corresponding to each beam may also be different. In the method provided in the second aspect, the second communication apparatus may determine a target segmentation point for the cell corresponding to each beam, so that each cell performs communication by using a corresponding target segmentation point, to meet a requirement of a terminal in each cell.

In a possible implementation, the target segmentation point is different from a current segmentation point that is of the digital processing operation between the first communication apparatus and the second communication apparatus and that is corresponding to the cell, and the method further includes: The second communication apparatus changes the current segmentation point to the target segmentation point; the second communication apparatus receives a first complete message from the first communication apparatus, where the first complete message is used to indicate that the first communication apparatus has changed the current segmentation point to the target segmentation point; and the second communication apparatus sends a second complete message to the first communication apparatus, where the second complete message is used to indicate that the second communication apparatus has changed the current segmentation point to the target segmentation point. Based on the foregoing method, when a segmentation point that is of the digital processing operation between the first communication apparatus and the second communication apparatus and that is corresponding to the cell changes, the first communication apparatus may change the segmentation point that is of the digital processing operation between the first communication apparatus and the second communication apparatus and that is corresponding to the cell to a latest determined segmentation point, and notify the second communication apparatus that the first communication apparatus has successfully performed changing. Similarly, the second communication apparatus may change the segmentation point that is of the digital processing operation between the first communication apparatus and the second communication apparatus and that is corresponding to the cell to the latest determined segmentation point, and notify the first communication apparatus that the second communication apparatus has successfully performed changing. In this way, the first communication apparatus and the second communication apparatus may communicate with each other by using the latest determined segmentation point.

In a possible implementation, the type of the cell includes an IoT cell, a high-speed cell, an access point cell, or a hotspot cell. Based on the foregoing method, the type of the cell corresponding to the first beam may include the foregoing types. In this way, the second communication apparatus may determine a segmentation point for the IoT cell, the high-speed cell, the access point cell, and the hotspot cell, to meet requirements of different types of cells and improve user experience.

In a possible implementation, the first communication apparatus is a satellite, the second communication apparatus is a terrestrial station, the type of the cell is a hotspot cell, and the method further includes: The second communication apparatus receives measurement information from the first communication apparatus, where the measurement information is used to indicate quality of a channel between the first communication apparatus and a terminal, and the terminal is a terminal in the cell; and the second communication apparatus sends feedback information of the measurement information to the first communication apparatus based on the measurement information. Based on the foregoing method, the terrestrial station may receive measurement information that is from the satellite and that is used to indicate quality of a channel between the satellite and the terminal, and send feedback information of the measurement information to the satellite based on the measurement information, so that the satellite may adjust a communication parameter between the satellite and the terminal based on the quality of the channel between the satellite and the terminal. In this way, network performance and transmission efficiency can be improved.

In a possible implementation, the feedback information of the measurement information is used to adjust the first beam; or the feedback information of the measurement information is used to schedule a terminal in the cell. Based on the foregoing method, the terrestrial station may assist the satellite in adjusting the first beam, so that the first beam is targeted at the terminal; or the terrestrial station may assist the satellite in scheduling the terminal in the cell corresponding to the first beam.

According to a third aspect, an embodiment of this application provides a method for determining a segmentation point of a digital processing operation, and the method includes: A controller obtains a type of a cell corresponding to a first beam of a satellite, where the first beam is any one of a plurality of beams of the satellite, and the type of the cell is determined based on location information of the cell; and the controller determines, based on the type of the cell, a target segmentation point corresponding to the cell, where the target segmentation point is a target segmentation point of a digital processing operation between the satellite and a terrestrial station.

According to the method provided in the third aspect, the controller may obtain the type of the cell corresponding to the first beam, and determine, based on the type of the cell, the target segmentation point that is of the digital processing operation between the satellite and the terrestrial station and that is corresponding to the cell. In this way, for data of the cell, the satellite may exchange the data with the terrestrial station based on the target segmentation point, and the satellite and the terrestrial station jointly complete the digital processing operation. In addition, the satellite includes a plurality of beams, and a terminal in a cell corresponding to each beam has a different requirement, and therefore, a segmentation point of a digital processing operation corresponding to the cell corresponding to each beam may also be different. In the method provided in the third aspect, the controller may determine a target segmentation point for the cell corresponding to each beam, so that each cell performs communication by using a corresponding target segmentation point, to meet a requirement of a terminal in each cell.

In a possible implementation, the method further includes: The controller sends information about the target segmentation point to the satellite and the terrestrial station, where the information about the target segmentation point is used to indicate the target segmentation point. Based on the foregoing method, after determining the target segmentation point, the controller may notify the satellite and the terrestrial station of the target segmentation point, so that the satellite and the terrestrial station determine the target segmentation point that is of the digital processing operation between the satellite and the terrestrial station and that is corresponding to the cell.

In a possible implementation, the target segmentation point is different from a current segmentation point that is of the digital processing operation between the satellite and the terrestrial station and that is corresponding to the cell, and the method further includes: The controller sends a segmentation start message to the satellite and the terrestrial station, where the segmentation start message is used to indicate to change the current segmentation point to the target segmentation point. Based on the foregoing method, when a segmentation point that is of the digital processing operation between the satellite and the terrestrial station and that is corresponding to the cell changes, the controller may indicate the satellite and the terrestrial station to change the segmentation point that is of the digital processing operation between the satellite and the terrestrial station and that is corresponding to the cell to a latest determined segmentation point, so that the satellite and the terrestrial station perform communication by using the latest determined segmentation point.

In a possible implementation, the method further includes: The controller sends a segmentation execute message to the satellite and the terrestrial station, where the segmentation execute message is used to indicate to process a signal based on the target segmentation point. Based on the foregoing method, the controller may further indicate, by sending the segmentation execute message to the satellite and the terrestrial station, the satellite and the terrestrial station to start to communicate with a peer end by using the target segmentation point.

According to a fourth aspect, an embodiment of this application provides a method for determining a segmentation point of a digital processing operation, and the method includes: A satellite receives information about a target segmentation point from a controller, where the information about the target segmentation point is used to indicate a target segmentation point corresponding to a cell, the target segmentation point is a target segmentation point of a digital processing operation between the satellite and a terrestrial station, the cell is a cell corresponding to a first beam, and the first beam is any one of a plurality of beams of the satellite; and the satellite determines the target segmentation point based on the information about the target segmentation point.

According to the method provided in the fourth aspect, the satellite may receive the information about the target segmentation point from the controller, and determine, based on the information about the target segmentation point, the target segmentation point that is of the digital processing operation between the satellite and the terrestrial station and that is corresponding to the cell corresponding to the first beam. In this way, for data of the cell, the satellite may exchange the data with the terrestrial station based on the target segmentation point, and the satellite and the terrestrial station jointly complete the digital processing operation. In addition, the satellite includes a plurality of beams, and a terminal in a cell corresponding to each beam has a different requirement, and therefore, a segmentation point of a digital processing operation corresponding to the cell corresponding to each beam may also be different. In the method provided in the fourth aspect, the satellite may determine a target segmentation point for the cell corresponding to each beam, so that each cell performs communication by using a corresponding target segmentation point, to meet a requirement of a terminal in each cell.

In a possible implementation, the target segmentation point is different from a current segmentation point that is of the digital processing operation between the satellite and the terrestrial station and that is corresponding to the cell, and the method further includes: The satellite receives a segmentation start message from the controller, where the segmentation start message is used to indicate to change the current segmentation point to the target segmentation point; and the satellite changes the current segmentation point to the target segmentation point. Based on the foregoing method, when a segmentation point that is of the digital processing operation between the satellite and the terrestrial station and that is corresponding to the cell changes, the satellite may receive the segmentation start message from the controller, and change the current segmentation point to the target segmentation point. In this way, in subsequent transmission, the satellite may communicate with the terrestrial station by using the target segmentation point.

In a possible implementation, the method further includes: The satellite receives a segmentation execute message from the controller, where the segmentation execute message is used to indicate to process a signal based on the target segmentation point. Based on the foregoing method, the satellite receives the segmentation execute message from the controller, and starts to communicate with the terrestrial station by using the target segmentation point.

In a possible implementation, a type of the cell corresponding to the target segmentation point is a hotspot cell, and the method further includes: The satellite receives measurement information from a terminal, where the terminal is a terminal in the cell, and the measurement information is used to indicate quality of a channel between the satellite and the terminal; the satellite sends the measurement information to the terrestrial station; the satellite receives feedback information of the measurement information from the terrestrial station; and the satellite communicates with the terminal based on the feedback information of the measurement information. Based on the foregoing method, the satellite may receive the measurement information from the terminal, and send the measurement information from the terminal to the terrestrial station. The satellite may further receive feedback information of the measurement information from the terrestrial station, and communicate with the terminal based on the feedback information of the measurement information. The measurement information may be used to indicate quality of a channel between the satellite and the terminal. In this way, the satellite may adjust a communication parameter between the satellite and the terminal based on the quality of the channel between the satellite and the terminal, so that network performance and transmission efficiency can be improved.

In a possible implementation, the feedback information of the measurement information is used to adjust the beam corresponding to the cell; or the feedback information of the measurement information is used to schedule a terminal in the cell. Based on the foregoing method, the satellite may adjust the first beam based on the feedback information of the measurement information, so that the first beam is targeted at the terminal; or the satellite may schedule, based on the feedback information of the measurement information, the terminal in the cell corresponding to the first beam. In this way, network performance and transmission efficiency can be improved.

According to a fifth aspect, an embodiment of this application provides a method for determining a segmentation point of a digital processing operation, and the method includes: A terrestrial station receives information about a target segmentation point from a controller, where the information about the target segmentation point is used to indicate a target segmentation point corresponding to a cell, the target segmentation point is a target segmentation point of a digital processing operation between a satellite and the terrestrial station, the cell is a cell corresponding to a first beam, and the first beam is any one of a plurality of beams of the satellite; and the terrestrial station determines the target segmentation point based on the information about the target segmentation point.

According to the method provided in the fifth aspect, the terrestrial station may receive the information about the target segmentation point from the controller, and determine, based on the information about the target segmentation point, the target segmentation point that is of the digital processing operation between the satellite and the terrestrial station and that is corresponding to the cell corresponding to the first beam. In this way, for data of the cell, the terrestrial station may exchange the data with the satellite based on the target segmentation point, and the terrestrial station and the satellite jointly complete the digital processing operation. In addition, the satellite includes a plurality of beams, and a terminal in a cell corresponding to each beam has a different requirement, and therefore, a segmentation point of a digital processing operation corresponding to the cell corresponding to each beam may also be different. In the method provided in the fifth aspect, the terrestrial station may determine a target segmentation point for the cell corresponding to each beam, so that each cell performs communication by using a corresponding target segmentation point, to meet a requirement of a terminal in each cell.

In a possible implementation, the target segmentation point is different from a current segmentation point that is of the digital processing operation between the satellite and the terrestrial station and that is corresponding to the cell, and the method further includes: The terrestrial station receives a segmentation start message from the controller, where the segmentation start message is used to indicate to change the current segmentation point to the target segmentation point; and the terrestrial station changes the current segmentation point to the target segmentation point. Based on the foregoing method, when a segmentation point that is of the digital processing operation between the satellite and the terrestrial station and that is corresponding to the cell changes, the terrestrial station may receive the segmentation start message from the controller, and change the current segmentation point to the target segmentation point. In this way, in subsequent transmission, the terrestrial station may communicate with the satellite by using the target segmentation point.

In a possible implementation, the method further includes: The terrestrial station receives a segmentation execute message from the controller, where the segmentation execute message is used to indicate to process a signal based on the target segmentation point. Based on the foregoing method, the terrestrial station receives the segmentation execute message from the controller, and starts to communicate with the satellite by using the target segmentation point.

In a possible implementation, a type of the cell corresponding to the target segmentation point is a hotspot cell, and the method further includes: The terrestrial station receives measurement information from the satellite, where the measurement information is used to indicate quality of a channel between the satellite and a terminal, and the terminal is a terminal in the cell; and the terrestrial station sends feedback information of the measurement information to the satellite. Based on the foregoing method, the terrestrial station may receive measurement information that is from the satellite and that is used to indicate quality of a channel between the satellite and the terminal, and send feedback information of the measurement information to the satellite based on the measurement information, so that the satellite may adjust a communication parameter between the satellite and the terminal based on the quality of the channel between the satellite and the terminal. In this way, network performance and transmission efficiency can be improved.

In a possible implementation, the feedback information of the measurement information is used to adjust the beam corresponding to the cell; or the feedback information of the measurement information is used to schedule a terminal in the cell. Based on the foregoing method, the terrestrial station may assist the satellite in adjusting the first beam, so that the first beam is targeted at the terminal; or the terrestrial station may assist the satellite in scheduling the terminal in the cell corresponding to the first beam.

According to a sixth aspect, an embodiment of this application provides a communication apparatus, and the communication apparatus may implement the method in the first aspect or any possible implementation of the first aspect. The apparatus includes a corresponding unit or component configured to perform the foregoing method. The unit included in the apparatus may be implemented by using software and/or hardware. The apparatus may be, for example, a terminal, or a chip, a chip system, a processor, or the like that can support the terminal in implementing the foregoing method.

According to a seventh aspect, an embodiment of this application provides a communication apparatus, and the communication apparatus may implement the method in the second aspect or any possible implementation of the second aspect. The apparatus includes a corresponding unit or component configured to perform the foregoing method. The unit included in the apparatus may be implemented by using software and/or hardware. The apparatus may be, for example, a network device, or a chip, a chip system, a processor, or the like that can support the network device in implementing the foregoing method.

According to an eighth aspect, an embodiment of this application provides a communication apparatus, and the communication apparatus includes a processing module. The processing module is configured to obtain a type of a cell corresponding to a first beam of a satellite, where the first beam is any one of a plurality of beams of the satellite, and the type of the cell is determined based on location information of the cell. The processing module is further configured to determine, based on the type of the cell, a target segmentation point corresponding to the cell, where the target segmentation point is a target segmentation point of a digital processing operation between the satellite and a terrestrial station.

In a possible implementation, the communication apparatus further includes a sending module. The sending module is configured to send information about the target segmentation point to the satellite and the terrestrial station, where the information about the target segmentation point is used to indicate the target segmentation point.

In a possible implementation, the target segmentation point is different from a current segmentation point that is of the digital processing operation between the satellite and the terrestrial station and that is corresponding to the cell. The sending module is further configured to send a segmentation start message to the satellite and the terrestrial station, where the segmentation start message is used to indicate to change the current segmentation point to the target segmentation point.

In a possible implementation, the sending module is further configured to send a segmentation execute message to the satellite and the terrestrial station, where the segmentation execute message is used to indicate to process a signal based on the target segmentation point.

According to a ninth aspect, an embodiment of this application provides a communication apparatus, and the communication apparatus includes a receiving module and a processing module. The receiving module is configured to receive information about a target segmentation point from a controller, where the information about the target segmentation point is used to indicate a target segmentation point corresponding to a cell, the target segmentation point is a target segmentation point of a digital processing operation between the communication apparatus and a terrestrial station, the cell is a cell corresponding to a first beam, and the first beam is any one of a plurality of beams of the communication apparatus. The processing module is configured to determine the target segmentation point based on the information about the target segmentation point.

In a possible implementation, the target segmentation point is different from a current segmentation point that is of the digital processing operation between the communication apparatus and the terrestrial station and that is corresponding to the cell. The receiving module is further configured to receive a segmentation start message from the controller, where the segmentation start message is used to indicate to change the current segmentation point to the target segmentation point. The processing module is further configured to change the current segmentation point to the target segmentation point.

In a possible implementation, the receiving module is further configured to receive a segmentation execute message from the controller, where the segmentation execute message is used to indicate to process a signal based on the target segmentation point.

In a possible implementation, a type of the cell corresponding to the target segmentation point is a hotspot cell, and the communication apparatus further includes a sending module. The receiving module is further configured to receive measurement information from a terminal, where the terminal is a terminal in the cell, and the measurement information is used to indicate quality of a channel between the communication apparatus and the terminal. The sending module is configured to send the measurement information to the terrestrial station. The receiving module is further configured to receive feedback information of the measurement information from the terrestrial station. The processing module is further configured to communicate with the terminal based on the feedback information of the measurement information.

In a possible implementation, the feedback information of the measurement information is used to adjust the beam corresponding to the cell; or the feedback information of the measurement information is used to schedule a terminal in the cell.

According to a tenth aspect, an embodiment of this application provides a communication apparatus, and the communication apparatus includes a receiving module and a processing module. The receiving module is configured to receive information about a target segmentation point from a controller, where the information about the target segmentation point is used to indicate a target segmentation point corresponding to a cell, the target segmentation point is a target segmentation point of a digital processing operation between a satellite and the communication apparatus, the cell is a cell corresponding to a first beam, and the first beam is any one of a plurality of beams of the satellite. The processing module is configured to determine the target segmentation point based on the information about the target segmentation point.

In a possible implementation, the target segmentation point is different from a current segmentation point that is of the digital processing operation between the satellite and the communication apparatus and that is corresponding to the cell. The receiving module is further configured to receive a segmentation start message from the controller, where the segmentation start message is used to indicate to change the current segmentation point to the target segmentation point. The processing module is further configured to change the current segmentation point to the target segmentation point.

In a possible implementation, the receiving module is further configured to receive a segmentation execute message from the controller, where the segmentation execute message is used to indicate to process a signal based on the target segmentation point.

In a possible implementation, a type of the cell corresponding to the target segmentation point is a hotspot cell, and the communication apparatus further includes a sending module. The receiving module is further configured to receive measurement information from the satellite, where the measurement information is used to indicate quality of a channel between the satellite and a terminal, and the terminal is a terminal in the cell. The sending module is configured to send feedback information of the measurement information to the satellite.

In a possible implementation, the feedback information of the measurement information is used to adjust the beam corresponding to the cell; or the feedback information of the measurement information is used to schedule a terminal in the cell.

According to an eleventh aspect, an embodiment of this application provides a communication apparatus, including a processor. The processor is coupled to a memory, the memory is configured to store a program or an instruction, and when the program or the instruction is executed by the processor, the apparatus is enabled to implement the method in the first aspect or any possible implementation of the first aspect.

According to a twelfth aspect, an embodiment of this application provides a communication apparatus, including a processor. The processor is coupled to a memory, the memory is configured to store a program or an instruction, and when the program or the instruction is executed by the processor, the apparatus is enabled to implement the method in the second aspect or any possible implementation of the second aspect.

According to a thirteenth aspect, an embodiment of this application provides a communication apparatus, including a processor. The processor is coupled to a memory, the memory is configured to store a program or an instruction, and when the program or the instruction is executed by the processor, the apparatus is enabled to implement the method in the third aspect or any possible implementation of the third aspect.

According to a fourteenth aspect, an embodiment of this application provides a communication apparatus, including a processor. The processor is coupled to a memory, the memory is configured to store a program or an instruction, and when the program or the instruction is executed by the processor, the apparatus is enabled to implement the method in the fourth aspect or any possible implementation of the fourth aspect.

According to a fifteenth aspect, an embodiment of this application provides a communication apparatus, including a processor. The processor is coupled to a memory, the memory is configured to store a program or an instruction, and when the program or the instruction is executed by the processor, the apparatus is enabled to implement the method in the fifth aspect or any possible implementation of the fifth aspect.

According to a sixteenth aspect, an embodiment of this application provides a communication apparatus, and the apparatus is configured to implement the method in the first aspect or any possible implementation of the first aspect.

According to a seventeenth aspect, an embodiment of this application provides a communication apparatus, and the apparatus is configured to implement the method in the second aspect or any possible implementation of the second aspect.

According to an eighteenth aspect, an embodiment of this application provides a communication apparatus, and the apparatus is configured to implement the method in the third aspect or any possible implementation of the third aspect.

According to a nineteenth aspect, an embodiment of this application provides a communication apparatus, and the apparatus is configured to implement the method in the fourth aspect or any possible implementation of the fourth aspect.

According to a twentieth aspect, an embodiment of this application provides a communication apparatus, and the apparatus is configured to implement the method in the fifth aspect or any possible implementation of the fifth aspect.

According to a twenty-first aspect, an embodiment of this application provides a computer readable medium, and a computer program or an instruction is stored on the computer readable medium. When the computer program or the instruction is executed, a computer is enabled to perform the method in the first aspect or any possible implementation of the first aspect.

According to a twenty-second aspect, an embodiment of this application provides a computer readable medium, and a computer program or an instruction is stored on the computer readable medium. When the computer program or the instruction is executed, a computer is enabled to perform the method in the second aspect or any possible implementation of the second aspect.

According to a twenty-third aspect, an embodiment of this application provides a computer readable medium, and a computer program or an instruction is stored on the computer readable medium. When the computer program or the instruction is executed, a computer is enabled to perform the method in the third aspect or any possible implementation of the third aspect.

According to a twenty-fourth aspect, an embodiment of this application provides a computer readable medium, and a computer program or an instruction is stored on the computer readable medium. When the computer program or the instruction is executed, a computer is enabled to perform the method in the fourth aspect or any possible implementation of the fourth aspect.

According to a twenty-fifth aspect, an embodiment of this application provides a computer readable medium, and a computer program or an instruction is stored on the computer readable medium. When the computer program or the instruction is executed, a computer is enabled to perform the method in the fifth aspect or any possible implementation of the fifth aspect.

According to a twenty-sixth aspect, an embodiment of this application provides a computer program product, and the computer program product includes computer program code. When the computer program code is run on a computer, the computer is enabled to perform the method in the first aspect or any possible implementation of the first aspect.

According to a twenty-seventh aspect, an embodiment of this application provides a computer program product, and the computer program product includes computer program code. When the computer program code is run on a computer, the computer is enabled to perform the method in the second aspect or any possible implementation of the second aspect.

According to a twenty-eighth aspect, an embodiment of this application provides a computer program product, and the computer program product includes computer program code. When the computer program code is run on a computer, the computer is enabled to perform the method in the third aspect or any possible implementation of the third aspect.

According to a twenty-ninth aspect, an embodiment of this application provides a computer program product, and the computer program product includes computer program code. When the computer program code is run on a computer, the computer is enabled to perform the method in the fourth aspect or any possible implementation of the fourth aspect.

According to a thirtieth aspect, an embodiment of this application provides a computer program product, and the computer program product includes computer program code. When the computer program code is run on a computer, the computer is enabled to perform the method in the fifth aspect or any possible implementation of the fifth aspect.

According to a thirty-first aspect, an embodiment of this application provides a chip, including a processor. The processor is coupled to a memory, the memory is configured to store a program or an instruction, and when the program or the instruction is executed by the processor, the chip is enabled to implement the method in the first aspect or any possible implementation of the first aspect.

According to a thirty-second aspect, an embodiment of this application provides a chip, including a processor. The processor is coupled to a memory, the memory is configured to store a program or an instruction, and when the program or the instruction is executed by the processor, the chip is enabled to implement the method in the second aspect or any possible implementation of the second aspect.

According to a thirty-third aspect, an embodiment of this application provides a chip, including a processor. The processor is coupled to a memory, the memory is configured to store a program or an instruction, and when the program or the instruction is executed by the processor, the chip is enabled to implement the method in the third aspect or any possible implementation of the third aspect.

According to a thirty-fourth aspect, an embodiment of this application provides a chip, including a processor. The processor is coupled to a memory, the memory is configured to store a program or an instruction, and when the program or the instruction is executed by the processor, the chip is enabled to implement the method in the fourth aspect or any possible implementation of the fourth aspect.

According to a thirty-fifth aspect, an embodiment of this application provides a chip, including a processor. The processor is coupled to a memory, the memory is configured to store a program or an instruction, and when the program or the instruction is executed by the processor, the chip is enabled to implement the method in the fifth aspect or any possible implementation of the fifth aspect.

According to a thirty-sixth aspect, an embodiment of this application provides a communication system. The system includes the apparatus according to the sixth aspect and/or the apparatus according to the seventh aspect; the system includes the apparatus according to the eleventh aspect and/or the apparatus according to the twelfth aspect; or the system includes the apparatus according to the sixteenth aspect and/or the apparatus according to the seventeenth aspect.

According to a thirty-seventh aspect, an embodiment of this application provides a communication system. The system includes the apparatus according to the eighth aspect, the apparatus according to the ninth aspect, and/or the apparatus according to the tenth aspect; the system includes the apparatus according to the thirteenth aspect, the apparatus according to the fourteenth aspect, and/or the apparatus according to the fifteenth aspect; or the system includes the apparatus according to the eighteenth aspect, the apparatus according to the nineteenth aspect, and/or the apparatus according to the twentieth aspect.

It may be understood that any communication apparatus, chip, computer readable medium, computer program product, or communication system provided above is used to perform the corresponding method provided above. Therefore, for beneficial effects that can be achieved by the communication apparatus, the chip, the computer readable medium, the computer program product, or the communication system, refer to beneficial effects in the corresponding method. Details are not described herein again.

DETAILED DESCRIPTION OF ILLUSTRATIVE EMBODIMENTS

The following describes the implementations of embodiments of this application in detail with reference to accompanying drawings.

A method provided in embodiments of this application may be applied to various mobile satellite communication systems, for example, a geostationary earth orbit (GEO) satellite communication system, a non-geostationary earth orbit (NGEO) satellite communication system, or a new mobile satellite communication system in the future. Only a satellite communication system 10 shown in FIG. 1A is used as an example below to describe the method provided in embodiments of this application.

Figure 1A:
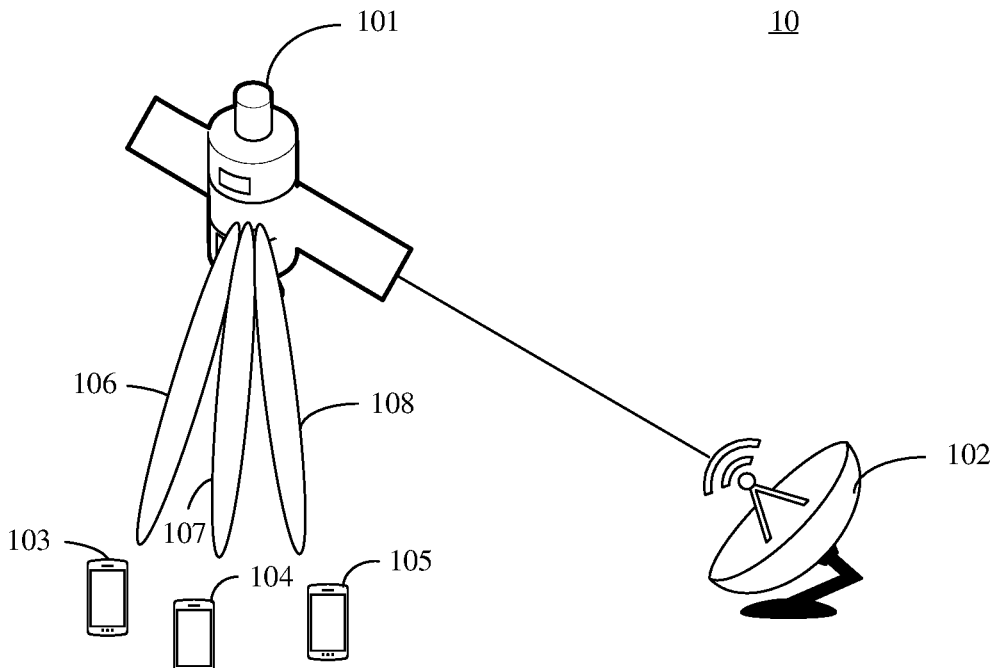
FIG. 1A is a schematic diagram of an architecture of a satellite communication system according to an embodiment of this application.

FIG. 1A is a schematic diagram of an architecture of a satellite communication system 10 according to an embodiment of this application. In FIG. 1A, the satellite communication system 10 includes a satellite 101, a terrestrial station 102, and a terminal 103 to a terminal 105.

Figure 1B:
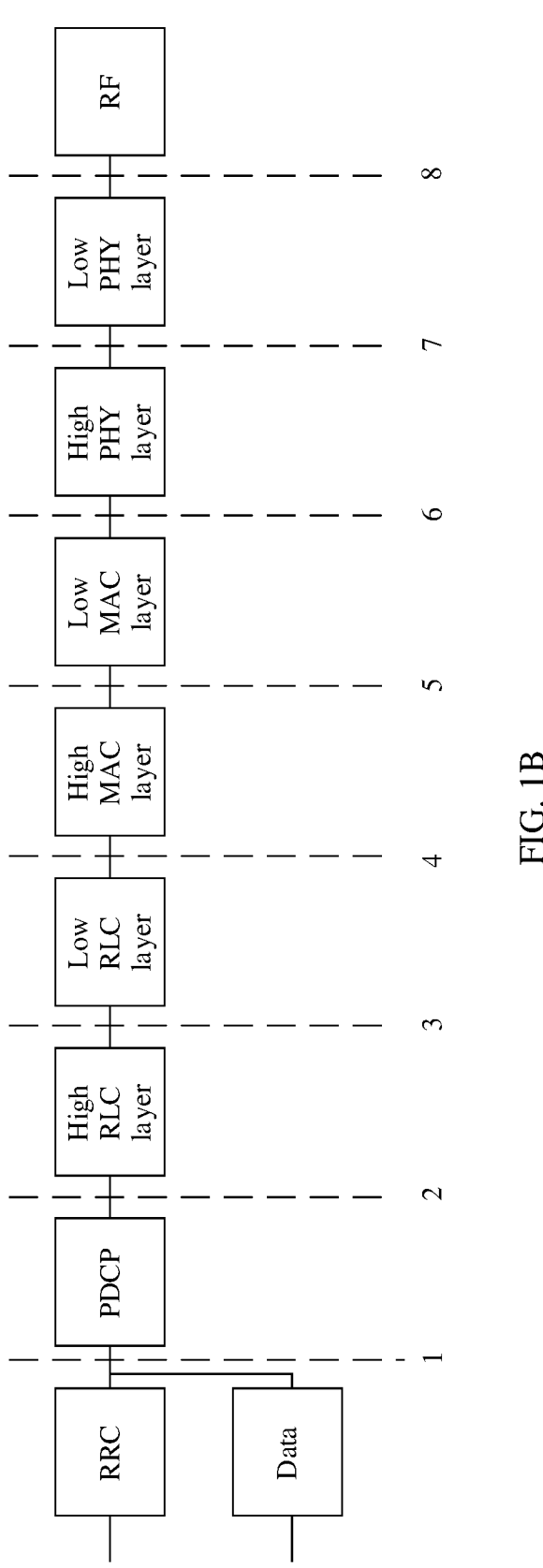
FIG. 1B is a schematic diagram of segmentation of a digital processing operation according to an embodiment of this application.

The satellite 101 has a plurality of beams (only three beams are shown in FIG. 1B: a beam 106 to a beam 108), and each beam corresponds to a cell. The satellite 101 may communicate with the terminal 103 to the terminal 105 by using the plurality of beams. For example, the satellite 101 communicates with the terminal 103 by using the beam 106, the satellite 101 communicates with a terminal 104 by using a beam 107, and the satellite 101 communicates with the terminal 105 by using the beam 108. The satellite 101 may further communicate with the terrestrial station 102 to jointly process a received signal from the terminal.

In some embodiments, the satellite 101 has a specific digital processing capability. For example, the satellite 101 may perform a complete digital processing operation on the received signal from the terminal. For another example, the satellite 101 may perform a part of the digital processing operation on the received signal from the terminal to obtain a processed signal, and send the processed signal to the terrestrial station 102. After receiving the processed signal, the terrestrial station 102 performs the other part of the digital processing operation on the processed signal.

The digital processing operation may include a plurality of operations, for example, a physical (PHY) layer operation, a media access control (MAC) layer operation, a radio link control (RLC) layer operation, a packet data convergence protocol (PDCP) layer operation, or a radio resource control (RRC) layer operation.

FIG. 1B is a schematic diagram of segmentation of a digital processing operation. In FIG. 1B, the digital processing operation includes an RRC layer operation, a PDCP layer operation, a high RLC layer (High-RLC) operation, a low RLC layer (Low-RLC) operation, a high MAC layer (High-MAC) operation, a low MAC layer (Low-MAC) operation, a high PHY layer (High-PHY) operation, and a low PHY layer (Low-PHY) operation. A radio frequency (radio frequency, RF) module is an analog signal processing module.

In FIG. 1B, there are eight segmentation points for the digital processing operation. A segmentation point 1 indicates that an RRC layer is located in the terrestrial station 102, and a PDCP layer, a high RLC layer, a low RLC layer, a high MAC layer, a low MAC layer, a high PHY layer, a low PHY layer, and the RF module are located in the satellite 101. The segmentation point 1 may further be represented as RRC-PDCP. A segmentation point 2 indicates that the RRC layer and the PDCP layer are located in the terrestrial station 102, and the high RLC layer, the low RLC layer, the high MAC layer, the low MAC layer, the high PHY layer, the low PHY layer, and the RF module are located in the satellite 101. The segmentation point 2 may further be represented as PDCP-high RLC layer. A segmentation point 3 indicates that the RRC layer, the PDCP layer, and the high RLC layer are located in the terrestrial station 102, and the low RLC layer, the high MAC layer, the low MAC layer, the high PHY layer, the low PHY layer, and the RF module are located in the satellite 101. The segmentation point 3 may further be represented as high RLC layer-low RLC layer. A segmentation point 4 indicates that the RRC layer, the PDCP layer, the high RLC layer, and the low RLC layer are located in the terrestrial station 102, and the high MAC layer, the low MAC layer, the high PHY layer, the low PHY layer, and the RF module are located in the satellite 101. The segmentation point 4 may further be represented as low RLC layer-high MAC layer. A segmentation point 5 indicates that the RRC layer, the PDCP layer, the high RLC layer, the low RLC layer, and the high MAC layer are located in the terrestrial station 102, and the low MAC layer, the high PHY layer, the low PHY layer, and the RF module are located in the satellite 101. The segmentation point 5 may further be represented as high MAC layer-low MAC layer. A segmentation point 6 indicates that the RRC layer, the PDCP layer, the high RLC layer, the low RLC layer, the high MAC layer, and the low MAC layer are located in the terrestrial station 102, and the high PHY layer, the low PHY layer, and the RF module are located in the satellite 101. The segmentation point 6 may further be represented as low MAC layer-high PHY layer. A segmentation point 7 indicates that the RRC layer, the PDCP layer, the high RLC layer, the low RLC layer, the high MAC layer, the low MAC layer, and the high PHY layer are located in the terrestrial station 102, and the low PHY layer and the RF module are located in the satellite 101. The segmentation point 7 may further be represented as high PHY layer-low PHY layer. A segmentation point 8 indicates that the RRC layer, the PDCP layer, the high RLC layer, the low RLC layer, the high MAC layer, the low MAC layer, the high PHY layer, and the low PHY layer are located in the terrestrial station 102, and the RF module is located in the satellite 101. The segmentation point 8 may further be represented as low PHY layer-RF.

The terrestrial station 102 may communicate with the satellite 101. For example, the terrestrial station 102 receives a signal from the satellite 101 by using a feeder link, performs digital processing on the signal, and send the processed signal to the satellite 101 by using the feeder link.

The terminal in FIG. 1A such as the terminal 103, the terminal 104, or the terminal 105 is a device with a wireless receiving/transmitting function, and may be deployed on land and includes an indoor or outdoor, handheld, wearable, or vehicle-mounted device; may be deployed on a water surface (for example, on a ship); or may be deployed in the air (for example, on an airplane, a balloon, or a satellite). The terminal may be a mobile phone, a tablet computer (Pad), a computer with a wireless receiving/transmitting function, a virtual reality (VR) terminal, an augmented reality (AR) terminal, a terminal in industrial control, a vehicle-mounted terminal, a terminal in self-driving, a terminal in assisted driving, a terminal in remote medical, a terminal in a smart grid, a terminal in transportation safety, a terminal in a smart city, a terminal in a smart home, or the like. Application scenarios are not limited in embodiments of this application. The terminal may sometimes be referred to as a terminal device, user equipment (UE), an access terminal, a vehicle-mounted terminal, an industrial control terminal, a UE unit, a UE station, a mobile site, a mobile station, a remote station, a remote terminal, a mobile device, a UE terminal device, a wireless communication device, a machine terminal, a UE agent, a UE apparatus, or the like. The terminal may be fixed or mobile.

In this application, the terminal may be a terminal in an internet of things (IoT) system, and an IoT is an important part of development of an information technology in the future. A main technical feature of the IoT is an intelligent network in which things are connected to a network by using a communication technology, to implement man-computer interconnection and interconnection between things. The terminal in this application may be a terminal in machine type communication (MTC).

Optionally, the satellite communication system 10 shown in FIG. 1A further includes a controller (not shown in FIG. 1A). The controller may be a device independent of the satellite 101 and the terrestrial station 102, or may be located on the satellite 101 or the terrestrial station 102. If the controller is a device independent of the satellite 101 and the terrestrial station 102, the controller may be located on a side of the satellite 101, or may be located on a side of the terrestrial station 102. The controller may communicate with the satellite 101 and the terrestrial station 102.

In some embodiments, the controller has a capability of determining a segmentation point of a digital processing operation of a cell, and a configuration of notifying the satellite 101 and the terrestrial station 102 to configure the segmentation point. Subsequently, the satellite 101 and the terrestrial station 102 may exchange data based on the segmentation point.

Optionally, the satellite communication system 10 shown in FIG. 1A further includes a network device (not shown in FIG. 1A). The network device may communicate with the satellite 101. For example, the network device may send a signal to a core network by using the satellite 101, and the network device may further receive a signal from the core network by using the satellite 101.

In some embodiments, the network device may be any device that has a wireless receiving/transmitting function, including but not limited to an evolved NodeB (NodeB, eNB, or e-NodeB, evolutional NodeB) in a long term evolution (LTE) system, a base station (gNodeB or gNB) or a transmission receiving point/transmission reception point (TRP) in a new radio (NR) system, a subsequent evolved NodeB in the 3rd generation partnership project (3GPP), an access node in a wireless-fidelity (WiFi) system, and the like. The base station may be a macro base station, a micro base station, a picocell, a small cell, a relay station, a balloon station, or the like. The network device may alternatively be a wireless controller, a central unit (CU), and/or a distributed unit (DU) in a cloud radio access network (CRAN) scenario.

It should be noted that the satellite communication system 10 shown in FIG. 1A is merely used as an example, and is not used to limit the technical solution of this application. A person skilled in the art should understand that, in a specific implementation process, the satellite communication system 10 may further include another device, and a quantity of satellites, a quantity of terrestrial stations, and a quantity of terminals may also be determined based on a specific requirement.

Optionally, each network element in FIG. 1A in this embodiment of this application, such as the satellite 101 or the terrestrial station 102, may be a function module in a device. It may be understood that the foregoing function may be a network element in a hardware device such as a communication chip in a mobile phone, a software function running on dedicated hardware, or a virtualized function instantiated on a platform (for example, a cloud platform).

Figures 2, 3:
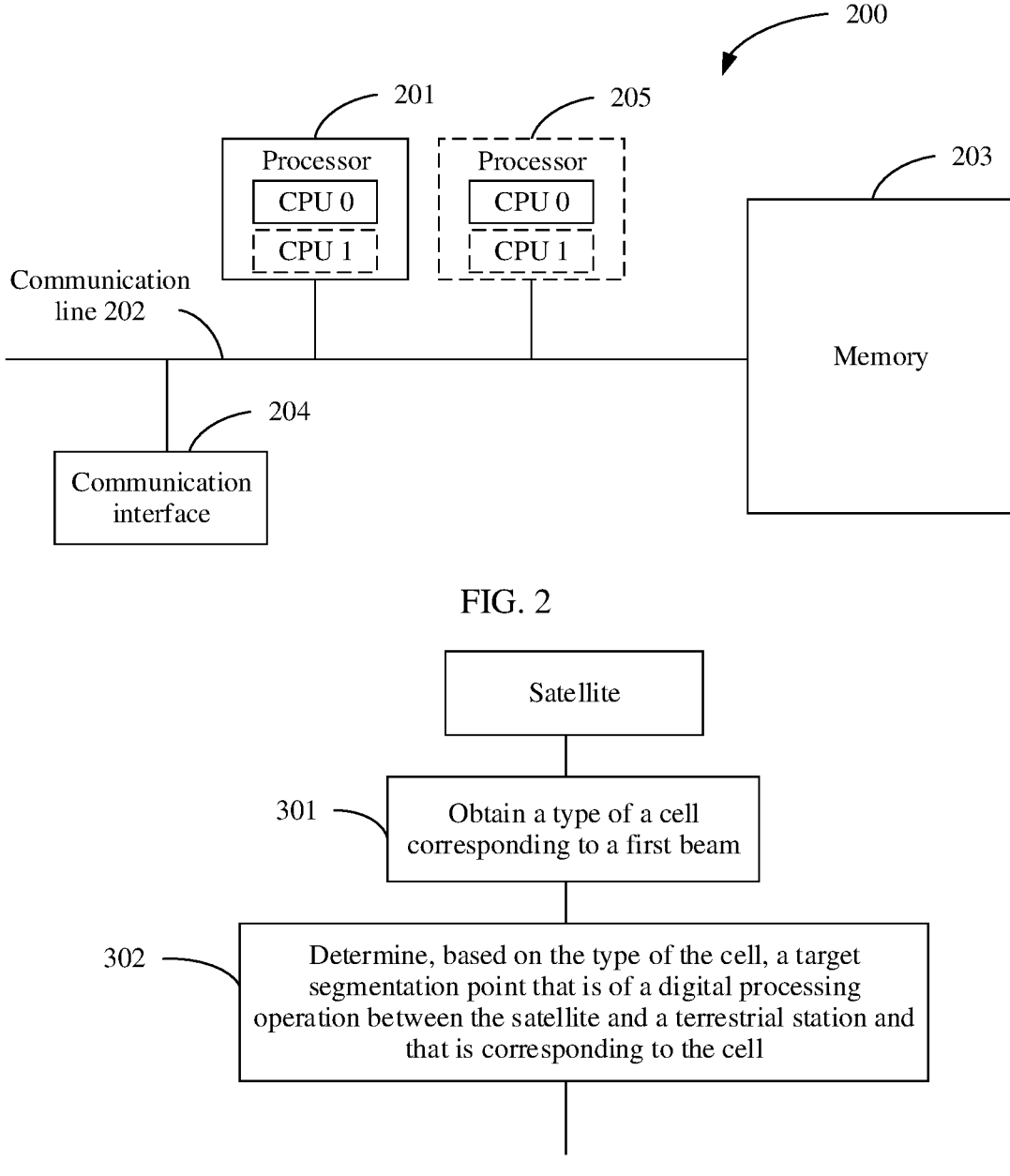
FIG. 2 is a schematic diagram of a hardware structure of a communication apparatus according to an embodiment of this application.
FIG. 3 is a schematic flowchart of a method for determining a segmentation point of a digital processing operation according to an embodiment of this application.

For example, each network element in FIG. 1A may be implemented by a communication apparatus 200 in FIG. 2. FIG. 2 is a schematic diagram of a hardware structure of a communication apparatus applicable to an embodiment of this application. The communication apparatus 200 includes at least one processor 201, a communication line 202, a memory 203, and at least one communication interface 204.

The processor 201 may be a general-purpose central processing unit (CPU), a microprocessor, an application-specific integrated circuit (ASIC), or one or more integrated circuits configured to control execution of programs in the solutions in this application.

The communication line 202 may include a channel such as a bus for transmitting information between the foregoing components.

The communication interface 204 is configured to communicate with another device or a communication network by using any apparatus such as a transceiver, and is, for example, an ethernet interface, a radio access network (RAN) interface, or a wireless local area network (WLAN) interface.

The memory 203 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that is accessible to a computer, but is not limited thereto. The memory may exist independently, and is connected to the processor through the communication line 202. The memory may alternatively be integrated with the processor. The memory provided in embodiments of this application may be usually non-volatile. The memory 203 is configured to store computer-executable instructions for executing the solutions in this application, and execution is controlled by the processor 201. The processor 201 is configured to execute the computer-executable instructions stored in the memory 203, to implement the method provided in embodiments of this application.

Optionally, computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

In specific implementation, in an embodiment, the communication apparatus 200 may include a plurality of processors such as a processor 201 and a processor 205 in FIG. 2. Each of the processors may be a single-core (single-CPU) processor or a multi-core (multi-CPU) processor. Herein, the processor may be one or more devices, circuits, and/or processing cores configured to process data (for example, computer program instructions).

A method for determining a segmentation point of a digital processing operation provided in embodiments of this application is specifically described below with reference to FIG. 1A, FIG. 1B, and FIG. 2.

It should be noted that names of messages between network elements, names of parameters in the messages, or the like in the following embodiments of this application are merely examples, and there may be other names during specific implementation. This is not specifically limited in embodiments of this application.

It should be noted that, in embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

It may be understood that a same step or steps or messages with a same function in embodiments of this application may be referenced in different embodiments.

It may be understood that, in embodiments of this application, the satellite, the terrestrial station, or the controller may perform some or all of steps in embodiments of this application, and these steps are merely examples. In embodiments of this application, another step or various step variations may also be performed. In addition, each step may be performed in an order different from that presented in embodiments of this application, and it is possible that not all steps in embodiments of this application are performed.

In embodiments of this application, a specific structure of an execution entity of the method for determining a segmentation point of a digital processing operation is not specifically limited in embodiments of this application, provided that a program that records code of the method for determining a segmentation point of a digital processing operation in embodiments of this application can be run to perform communication based on the method for determining a segmentation point of a digital processing operation in embodiments of this application. For example, the method for determining a segmentation point of a digital processing operation provided in embodiments of this application may be performed by a satellite, or a component applied to the satellite, such as a chip. This is not limited in this application. Alternatively, the method for determining a segmentation point of a digital processing operation provided in embodiments of this application may be performed by a terrestrial station, or a component applied to the terrestrial station, such as a chip. This is not limited in this application. Alternatively, the method for determining a segmentation point of a digital processing operation provided in embodiments of this application may be performed by a controller, or a component applied to the controller, such as a chip. This is not limited in this application. The following embodiments are described by using examples in which the method for determining a segmentation point of a digital processing operation is separately performed by the satellite, the terrestrial station, and the controller.

First, a method for determining a segmentation point of a digital processing operation provided in an embodiment of this application is described by using an example in which a first communication apparatus is a satellite and a second communication apparatus is a terrestrial station.

FIG. 3 shows a method for determining a segmentation point of a digital processing operation according to an embodiment of this application. The method for determining a segmentation point of a digital processing operation includes step 301 and step 302.

Step 301: A satellite obtains a type of a cell corresponding to a first beam.

The satellite may be the satellite 101 in FIG. 1A. The satellite has a plurality of beams. Each of the plurality of beams corresponds to a cell.

The first beam is any one of the plurality of beams. For example, if the satellite is the satellite 101 in FIG. 1A, the first beam may be the beam 106, the beam 107, or the beam 108 in FIG. 1A.

The type of the cell corresponding to the first beam includes an IoT cell, a high-speed cell, an access point cell, or a hotspot cell. A terminal in the IoT cell is an IoT device, such as a device used for asset management. The IoT cell has a low delay requirement. For example, a delay of the IoT cell is greater than or equal to a threshold. A terminal in the high-speed cell is a terminal that moves at a high speed, such as a terminal on an aircraft or a ship. A terminal in the access point (access point, AP) cell is an AP. A quantity of services of the hotspot cell is greater than or equal to a threshold. A terminal in the hotspot cell may be referred to as a hotspot terminal.

It should be noted that the IoT cell, the high-speed cell, the access point cell, or the hotspot cell is only an example of the type of the cell, and the type of the cell may alternatively include another type. This is not limited.

Optionally, the type of the cell corresponding to the first beam is determined based on location information of the cell. The location information of the cell is used to indicate a geographical location of the cell.

In a possible implementation, the satellite obtains the location information of the cell, and the satellite determines the type of the cell based on the location information of the cell.

Further, the satellite detects the location information of the cell corresponding to the first beam, and determines the type of the cell based on the location information of the cell. There is a correspondence between the location information of the cell and the type of the cell. The correspondence may be pre-stored in the satellite.

For example, the correspondence between the location information of the cell and the type of the cell is shown in Table 1. In Table 1, when the location information of the cell includes 39°43'37.8" North latitude and 87°24'40.2" East longitude, in other words, the cell is in a region in Xinjiang, China, the type of the cell is an IoT cell; when the location information of the cell includes 22°32'18.1" North latitude and 113°59'56.0" East longitude, in other words, the cell is in Nanshan District, Shenzhen, China, the type of the cell is a hotspot cell; and when the location information of the cell includes 23°55'33.0" North latitude and 113°57'09.4" East longitude, in other words, the cell is in a suburb of Guangdong, China, the type of the cell is an ordinary cell.

TABLE 1

| Location information of a cell | Type of the cell |
| --- | --- |
| 39°43'37.8" North latitude and 87°24'40.2" East longitude | IoT cell |
| 22°32'18.1" North latitude and 113°59'56.0" East longitude | Hotspot cell |
| 23°55'33.0" North latitude and 113°57'09.4" East longitude | Ordinary cell |

It should be noted that Table 1 is only an example of the correspondence between the location information of the cell and the type of the cell, and the correspondence between the location information of the cell and the type of the cell may be in another form, and is not limited.

It may be understood that the satellite may further obtain the type of the cell from a network device in the cell or a terminal in the cell. Descriptions of the network device may be the foregoing descriptions corresponding to FIG. 1A. The type of the cell is divided based on the location information of the cell.

For example, the satellite sends a request signal to the network device in the cell or the terminal in the cell, and receives a response signal from the network device or the terminal in the cell. The request signal is used to request the type of the cell, and the response signal includes information about the type of the cell.

The satellite has a feature of moving at a high speed. Therefore, the location information of the cell corresponding to the first beam continuously changes. The satellite may obtain, when the location information of the cell corresponding to the first beam changes, the type of the cell corresponding to the first beam. Alternatively, the satellite periodically obtains the type of the cell corresponding to the first beam.

Step 302: The satellite determines, based on the type of the cell, a target segmentation point that is of a digital processing operation between the satellite and a terrestrial station and that is corresponding to the cell.

The target segmentation point may be used to indicate digital processing operations separately performed by the satellite and the terrestrial station. The terrestrial station may be the terrestrial station 102 shown in FIG. 1A.

For example, the segmentation point shown in FIG. 1B is used as an example. If the target segmentation point is a segmentation point 2, an RRC layer and a PDCP layer are located in the terrestrial station, and a high RLC layer, a low RLC layer, a high MAC layer, a low MAC layer, a high PHY layer, a low PHY layer, and an RF module are located in the satellite. In other words, the digital processing operation performed by the terrestrial station includes an RRC layer operation and a PDCP layer operation. The digital processing operation performed by the satellite includes a high RLC layer operation, a low RLC layer operation, a high MAC layer operation, a low MAC layer operation, a high PHY layer operation, and a low PHY layer operation.

It should be noted that, in this embodiment of this application, a quantity of segmentation points in the target segmentation point is not limited. For example, the target segmentation point may include one or more segmentation points. When the target segmentation point includes a plurality of segmentation points, the satellite may determine one of the plurality of segmentation points based on an algorithm or a policy. The following embodiments of this application are described by using an example in which the target segmentation point includes one segmentation point.

Optionally, there is a correspondence between the type of the cell and the target segmentation point. If types of the cell are different, target segmentation points may be the same or different. Further, the terrestrial station performs more digital processing operations for a cell with a low delay requirement than a cell with a high delay requirement. In other words, a quantity of digital processing operations performed by the terrestrial station when a delay is greater than a first value is greater than a quantity of digital processing operations performed by the terrestrial station when the delay is less than the first value.

For example, a terminal in the IoT cell is generally fixed, a geographical location remains unchanged, and a service is relatively static, and is not sensitive to the delay. Therefore, most digital processing operations, such as encoding and decoding operations, may be placed on the terrestrial station. The hotspot cell mainly implements a relay function. The satellite requires fewer digital processing operations. Therefore, all digital processing operations may be placed on the terrestrial station. The ordinary cell requires some digital processing operations. Therefore, the target segmentation point may be determined based on a delay requirement. For the cell with a high delay requirement, most digital processing operations may be placed on the satellite. For the cell with a low delay requirement, most digital processing operations may be placed on the terrestrial station.

For example, the segmentation point shown in FIG. 1B is used as an example. The correspondence between the type of the cell and the target segmentation point may be shown in Table 2. In Table 2, a target segmentation point corresponding to the IoT cell is a segmentation point 7, a target segmentation point corresponding to the hotspot cell is a segmentation point 8, and a target segmentation point corresponding to the ordinary cell is a segmentation point 5.

TABLE 2

| Type of a cell | Target segmentation point |
| --- | --- |
| IoT cell | Segmentation point 7 |
| Hotspot cell | Segmentation point 8 |
| Ordinary cell | Segmentation point 5 |

It should be noted that Table 2 is only an example of the correspondence between the type of the cell and the target segmentation point, and the correspondence between the location information of the cell and the type of the cell may be in another form, and is not limited.

It should be noted that, in addition to the foregoing method for determining the target segmentation point in step 301 and step 302, the satellite may also determine the target segmentation point based on the location information of the cell corresponding to the first beam. There is a correspondence between the location information of the cell and the target segmentation point.

For example, the segmentation point shown in FIG. 1B is used as an example. The correspondence between the location information of the cell and the target segmentation point may be shown in Table 3. In Table 3, when the location information of the cell includes 39°43'37.8" North latitude and 87°24'40.2" East longitude, in other words, the cell is in a region in Xinjiang, China, the target segmentation point corresponding to the cell is a segmentation point 7; when the location information of the cell includes 22°32'18.1" North latitude and 113°59'56.0" East longitude, in other words, the cell is in Nanshan District, Shenzhen, China, the target segmentation point corresponding to the cell is a segmentation point 8; and when the location information of the cell includes 23°55'33.0" North latitude and 113°57'09.4" East longitude, in other words, the cell is in a suburb of Guangdong, China, the target segmentation point corresponding to the cell is a segmentation point 5.

TABLE 3

| Location information of a cell | Target segmentation point |
| --- | --- |
| 39°43'37.8" North latitude and 87°24'40.2" East longitude | Segmentation point 7 |
| 22°32'18.1" North latitude and 113°59'56.0" East longitude | Segmentation point 8 |
| 23°55'33.0" North latitude and 113°57'09.4" East longitude | Segmentation point 5 |

Based on the method shown in FIG. 3, the satellite may obtain the type of the cell corresponding to the first beam, and determine, based on the type of the cell, the target segmentation point that is of the digital processing operation between the satellite and the terrestrial station and that is corresponding to the cell. In this way, for data of the cell, the satellite may exchange the data with the terrestrial station based on the target segmentation point, and the satellite and the terrestrial station jointly complete the digital processing operation. In addition, the satellite includes a plurality of beams, and a terminal in a cell corresponding to each beam has a different requirement, and therefore, a segmentation point of a digital processing operation corresponding to the cell corresponding to each beam may also be different. In the method shown in FIG. 3, the satellite may determine a target segmentation point for the cell corresponding to each beam, so that each cell performs communication by using a corresponding target segmentation point, to meet a requirement of a terminal in each cell.

Figure 4:
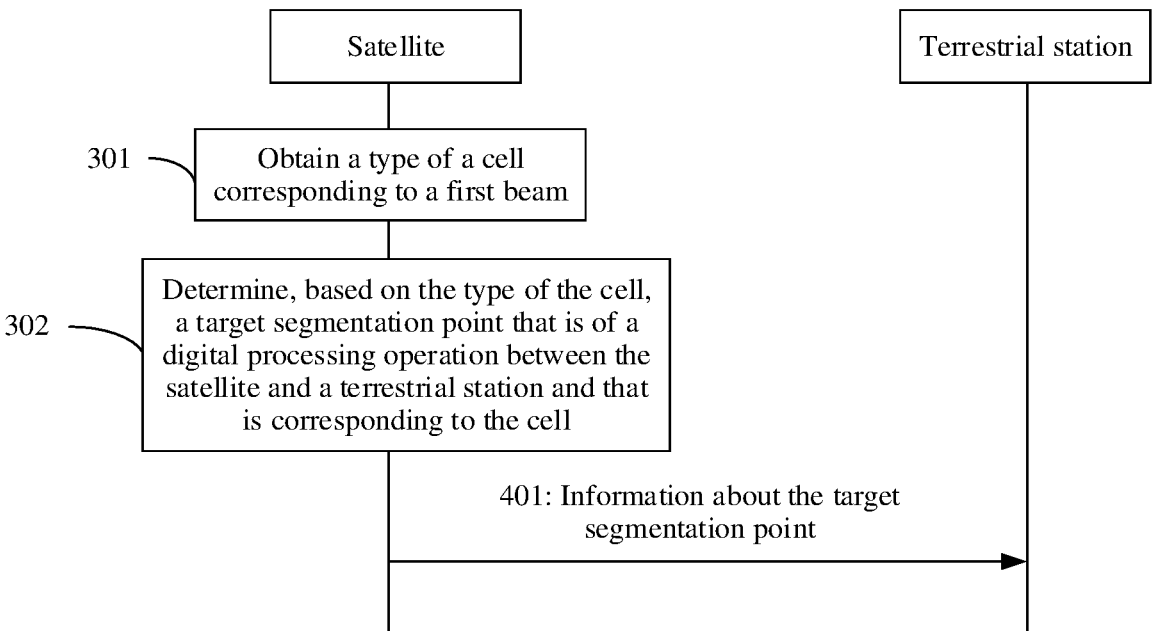
FIG. 4 is a schematic flowchart of another method for determining a segmentation point of a digital processing operation according to an embodiment of this application.

Further optionally, after determining the target segmentation point, the satellite may indicate the target segmentation point to the terrestrial station. In this way, the terrestrial station may also know the target segmentation point. Specifically, as shown in FIG. 4, the method shown in FIG. 3 further includes step 401.

Step 401: The satellite sends information about the target segmentation point to the terrestrial station.

The information about the target segmentation point is used to indicate the target segmentation point. For example, the information about the target segmentation point includes an identifier of the target segmentation point, such as a segmentation point 1.

In a possible implementation, the target segmentation point is the same as a current segmentation point that is of the digital processing operation between the satellite and the terrestrial station and that is corresponding to the cell, and the satellite exchanges data with the terrestrial station by using the current segmentation point. In this case, the satellite may alternatively not send the information about the target segmentation point to the terrestrial station.

In another possible implementation, the target segmentation point is different from the current segmentation point. The satellite changes the current segmentation point to the target segmentation point; the satellite sends a first complete message to the terrestrial station; and the satellite receives a second complete message from the terrestrial station. Specifically, refer to descriptions in the following method shown in FIG. 5.

Correspondingly, the terrestrial station receives the information about the target segmentation point from the satellite. Subsequently, the terrestrial station may determine the target segmentation point based on the information about the target segmentation point, and exchange data with the satellite based on the target segmentation point.

In a possible implementation, the target segmentation point is the same as the current segmentation point, and the terrestrial station exchanges data with the satellite by using the current segmentation point.

In another possible implementation, the target segmentation point is different from the current segmentation point. The terrestrial station changes the current segmentation point to the target segmentation point; the terrestrial station receives a first complete message from the satellite; and the terrestrial station sends a second complete message to the satellite. Specifically, refer to descriptions in the following method shown in FIG. 5.

Based on the method shown in FIG. 4, the satellite may send the information about the target segmentation point to the terrestrial station. In this way, both the satellite and the terrestrial station know the target segmentation point. Subsequently, for data of the cell, the satellite and the terrestrial station may exchange the data based on the target segmentation point, and jointly complete the digital processing operation.

Figure 5:
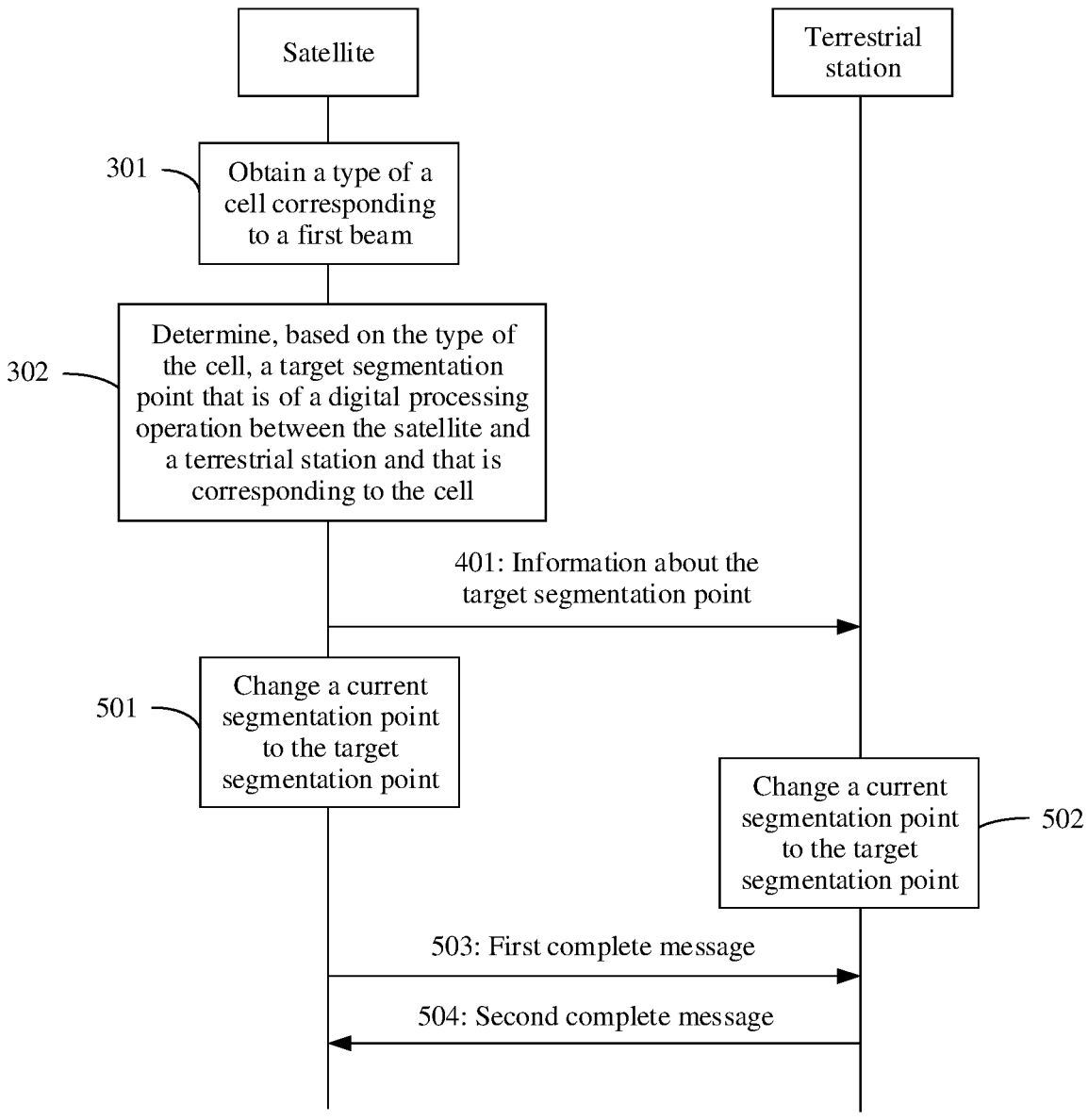
FIG. 5 is a schematic flowchart of another method for determining a segmentation point of a digital processing operation according to an embodiment of this application.

Further, if the target segmentation point is different from the current segmentation point, the satellite and the terrestrial station may change the current segmentation point to the target segmentation point. Subsequently, for data of the cell, the satellite and the terrestrial station may exchange data with each other based on the target segmentation point. Specifically, as shown in FIG. 5, the method shown in FIG. 4 further includes step 501 to step 504.

Step 501: The satellite changes the current segmentation point to the target segmentation point.

For example, the satellite configures a configuration of the target segmentation point, to implement data exchange between the satellite and the terrestrial station based on the target segmentation point. For example, if the current segmentation point is the segmentation point 7 in FIG. 1B, and the target segmentation point is the segmentation point 3 in FIG. 1B, before step 501, the low PHY layer and the RF module are located in the satellite. After the satellite configures a configuration of the target segmentation point 3, the low RLC layer, the high MAC layer, the low MAC layer, the high PHY layer, the low PHY layer, and the RF module are located in the satellite.

Step 502: The terrestrial station changes the current segmentation point to the target segmentation point.

For example, the terrestrial station configures a configuration of the target segmentation point, to implement data exchange between the satellite and the terrestrial station based on the target segmentation point. For example, if the current segmentation point is the segmentation point 7 in FIG. 1B, and the target segmentation point is the segmentation point 3 in FIG. 1B, before step 502, the RRC layer, the PDCP layer, the high RLC layer, the low RLC layer, the high MAC layer, the low MAC layer, and the PHY layer are located in the terrestrial station. After the terrestrial station configures a configuration of the target segmentation point 3, the RRC layer, the PDCP layer, and the high RLC layer are located in the terrestrial station.

It should be noted that an execution sequence of step 501 and step 502 is not limited in this embodiment of this application. For example, in this embodiment of this application, step 501 may be performed before step 502 is performed. Alternatively, in this embodiment of this application, step 502 may be performed before step 501 is performed.

Step 503: The satellite sends a first complete message to the terrestrial station.

The first complete message may be used to indicate that the satellite has changed the current segmentation point to the target segmentation point. For example, the first complete message includes 1-bit indication information, and the 1-bit indication information indicates that the satellite has changed the current segmentation point to the target segmentation point.

Correspondingly, the terrestrial station receives the first complete message from the satellite.

Optionally, after receiving the first complete message, the terrestrial station sends a first acknowledgment message to the satellite.

The first acknowledgment message may be used to indicate that the terrestrial station receives the first complete message. For example, the first acknowledgment message includes 1-bit indication information, and the 1-bit indication information indicates that the terrestrial station receives the first complete message.

It should be noted that, in a preset period of time, if the satellite does not receive the first acknowledgment message, the satellite sends the first complete message to the terrestrial station again.

Step 504: The terrestrial station sends a second complete message to the satellite.

The second complete message may be used to indicate that the terrestrial station has changed the current segmentation point to the target segmentation point. For example, the second complete message includes 1-bit indication information, and the 1-bit indication information indicates that the terrestrial station has changed the current segmentation point to the target segmentation point.

It should be noted that if the terrestrial station also needs to send the first acknowledgment message to the satellite, the first acknowledgment message and the second complete message may be sent together, or may be separately sent.

Correspondingly, the satellite receives the second complete message from the terrestrial station.

Optionally, after receiving the second complete message, the satellite sends a second acknowledgment message to the terrestrial station.

The second acknowledgment message may be used to indicate that the satellite receives the second complete message. For example, the second acknowledgment message includes 1-bit indication information, and the 1-bit indication information indicates that the satellite receives the second complete message.

It should be noted that, in a preset period of time, if the terrestrial station does not receive the second acknowledgment message, the terrestrial station sends the second complete message to the satellite again.

It should be noted that an execution sequence of step 503 and step 504 is not limited in this embodiment of this application. For example, in this embodiment of this application, step 503 may be performed before step 504 is performed. Alternatively, in this embodiment of this application, step 504 may be performed before step 503 is performed.

It may be understood that if the terrestrial station does not send the first acknowledgment message, and the satellite does not send the second acknowledgment message, after the satellite and the terrestrial station change the current segmentation point to the target segmentation point, the satellite and the terrestrial station start to exchange data with each other based on the target segmentation point. If the terrestrial station sends the first acknowledgment message and the satellite sends the second acknowledgment message, after the satellite receives the first acknowledgment message and the terrestrial station receives the second acknowledgment message, the satellite and the terrestrial station start to exchange data based on the target segmentation point.

Based on the method shown in FIG. 5, if the target segmentation point is different from the current segmentation point, the satellite and the terrestrial station may change the current segmentation point to the target segmentation point, and notify the other party that the current segmentation point has been changed to the target segmentation point. Subsequently, for data of the cell, the satellite and the terrestrial station may exchange the data based on the target segmentation point. In this way, before the target segmentation point is determined next time, after receiving a signal from a terminal in the cell, the satellite may exchange data with the terrestrial station based on the target segmentation point determined this time.

Figure 6:
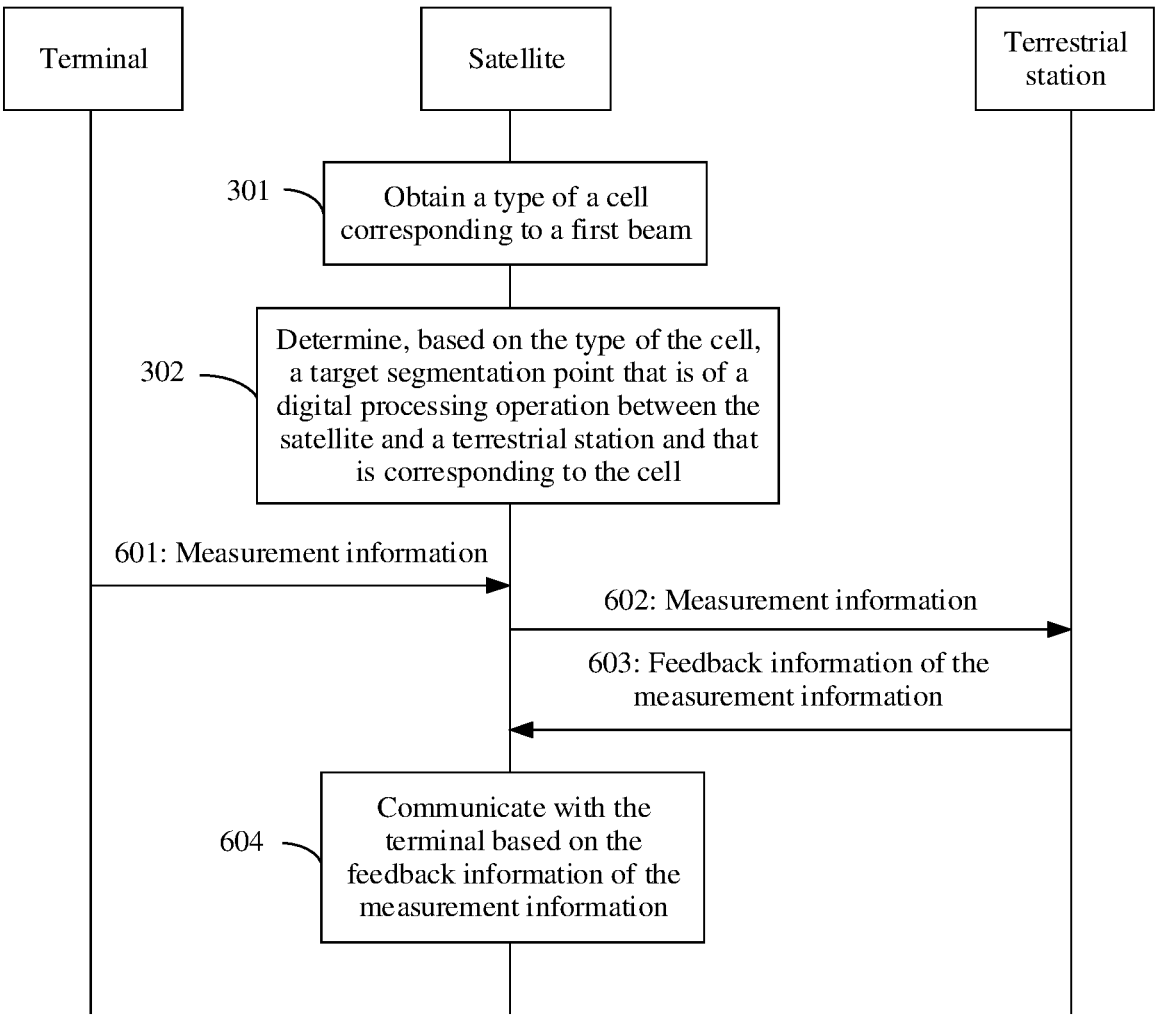
FIG. 6 is a schematic flowchart of another method for determining a segmentation point of a digital processing operation according to an embodiment of this application.

Optionally, in a possible implementation of the method shown in FIG. 3, if the type of the cell is a hotspot cell, and the hotspot cell has a relatively large service volume, and out of consideration of a size, costs, energy consumption, and the like, a digital processing capability on the satellite is limited, and consequently, a delay during communication is relatively large or a throughput is relatively low. Therefore, the satellite may further receive measurement information from the terminal, and send the measurement information to the terrestrial station, so that the terrestrial station assists, by using a signal processing algorithm such as a closed-loop precoding algorithm or a closed-loop scheduling algorithm, the satellite in improving network performance (for example, reduce a delay or increase a throughput). Specifically, as shown in FIG. 6, the method shown in FIG. 3 further includes step 601 to step 604.

Step 601: The satellite receives measurement information from a terminal.

The terminal may be a terminal in the cell corresponding to the first beam. For example, the first beam is the beam 106 in FIG. 1A, and a terminal in a cell corresponding to the beam 106 is the terminal 103; the first beam is the beam 107 in FIG. 1A, and a terminal in a cell corresponding to the beam 107 is the terminal 104; or the first beam is the beam 108 in FIG. 1A, and a terminal in a cell corresponding to the beam 108 is the terminal 105.

The measurement information may be used to indicate quality of a channel between the satellite and the terminal. For example, the measurement information is channel state information (CSI).

Optionally, the measurement information is sent by the terminal when being triggered by the satellite. For example, the satellite sends request information to the terminal, and the request information is used to request the measurement information; and the satellite receives the measurement information from the terminal.

It should be noted that the terminal may also be replaced with a network device. In this case, the measurement information may be used to indicate quality of a channel between the satellite and the network device. The measurement information is sent by the network device when being triggered by the satellite. For example, the satellite sends request information to the network device, and the request information is used to request the measurement information; and the satellite receives the measurement information from the network device.

Step 602: The satellite sends the measurement information to the terrestrial station.

Optionally, the satellite sends all or a part of the measurement information to the terrestrial station, so that the terrestrial station performs a signal processing algorithm based on the measurement information.

Step 603: The terrestrial station receives the measurement information from the satellite, and sends feedback information of the measurement information to the satellite.

The feedback information of the measurement information may be used to adjust the first beam; or the measurement information feedback information may be used to schedule the terminal in the cell corresponding to the first beam.

In a possible implementation, the terrestrial station performs the signal processing algorithm based on the measurement information and status information of the cell to which the terminal belongs, to obtain the feedback information of the measurement information.

The status information of the cell to which the terminal belongs is used to indicate a quantity of terminals in the cell and/or a service status (for example, a service volume size) of the terminal in the cell.

Further, the terrestrial station may periodically obtain status information of each cell. After receiving the measurement information from the satellite, the terrestrial station performs the signal processing algorithm based on the measurement information and latest status information of the cell, to obtain the feedback information of the measurement information.

The signal processing algorithm may include a closed-loop precoding algorithm and/or a closed-loop scheduling algorithm. The closed-loop precoding algorithm may include a zero forcing (ZF) algorithm, a minimum mean square error (MMSE) algorithm, or the like. The closed-loop scheduling algorithm may include a first come first serve (FCFS) algorithm, a round robin (round robin, RR) algorithm, or the like. It should be noted that for descriptions of the foregoing algorithms such as ZF, MMSE, FCFS, and RR, refer to explanations and descriptions in a conventional technology. Details are not described herein. The ZF algorithm and the MMSE algorithm are only examples of the closed-loop precoding algorithm. The closed-loop precoding algorithm may alternatively include other algorithms. These algorithms are not listed herein. The FCFS algorithm and the RR algorithm are only examples of the closed-loop scheduling algorithm. The closed-loop scheduling algorithm may alternatively include other algorithms. These algorithms are not listed herein.

When the signal processing algorithm includes the closed-loop precoding algorithm, the feedback information of the measurement information may be used to adjust the first beam, so that the first beam is targeted at the terminal. In this way, spectrum utilization can be improved, interference can be reduced, and transmission efficiency can be improved. When the signal processing algorithm includes the closed-loop scheduling algorithm, the feedback information of the measurement information may be used to schedule the terminal in the cell corresponding to the first beam. For example, the feedback information of the measurement information may be used to allocate a channel to the terminal in the cell corresponding to the first beam. For example, the feedback information of the measurement information includes a scheduling result of the terminal in the cell corresponding to the first beam.

Step 604: The satellite receives the feedback information of the measurement information from the terrestrial station, and communicates with the terminal based on the feedback information of the measurement information.

It may be understood that when a different signal processing algorithm is used, and a process in which the satellite communicates with the terminal based on the feedback information of the measurement information is different.

In a possible implementation, the signal processing algorithm includes the closed-loop precoding algorithm. Before communicating with the terminal based on the feedback information of the measurement information, the satellite may further perform an open-loop beamforming algorithm, for example, through table lookup or by using a simple calculation method, to obtain preliminary information of the first beam. The preliminary information of the first beam is used to indicate an approximate direction of the first beam. After receiving the feedback information of the measurement information, the satellite may obtain accurate information of the first beam based on the preliminary information of the first beam and the feedback information of the measurement information. The accurate information of the first beam is used to indicate an accurate direction of the first beam. Subsequently, the satellite may adjust the first beam based on the accurate information of the first beam, and communicate with the terminal by using the adjusted first beam.

It may be understood that, each of the plurality of beams of the satellite may use a separate radio frequency channel. In this case, after receiving the feedback information of the measurement information, the satellite may adjust the first beam based on the preliminary information of the first beam, or may adjust the first beam based on the feedback information of the measurement information.

In another possible implementation, the signal processing algorithm includes the closed-loop scheduling algorithm. Before communicating with the terminal based on the feedback information of the measurement information, the satellite may further perform a scheduling algorithm that is simpler than the closed-loop scheduling algorithm, such as a proportional fair algorithm, to obtain a preliminary scheduling result. After receiving the feedback information of the measurement information, the satellite may determine a final scheduling result from a scheduling result and the preliminary scheduling result that are included in the feedback information of the measurement information, and communicate with the terminal based on the final scheduling result.

It may be understood that a scheduling algorithm performed by the terrestrial station is more complex than the scheduling algorithm performed by the satellite. Therefore, the scheduling result included in the feedback information of the measurement information is more accurate than the preliminary scheduling result. When the scheduling result included in the feedback information of the measurement information conflicts with the preliminary scheduling result, the satellite determines the scheduling result included in the feedback information of the measurement information as a final scheduling result.

It should be noted that step 601 to step 604 may alternatively be performed after step 401 in the method shown in FIG. 4, or step 601 to step 604 may be performed after step 504 in the method shown in FIG. 5.

Based on the method shown in FIG. 6, the satellite may receive the measurement information from the terminal, and send the measurement information from the terminal to the terrestrial station. The satellite may further receive the feedback information of the measurement information from the terrestrial station, and adjust the first beam based on the feedback information of the measurement information, so that the first beam is targeted at the terminal; or the terminal in the cell corresponding to the first beam is scheduled based on the feedback information of the measurement information. In this way, network performance and transmission efficiency can be improved.

In the methods shown in FIG. 3 to FIG. 6, the segmentation point of the digital processing operation between the satellite and the terrestrial station is determined by the satellite. In addition, the segmentation point of the digital processing operation between the satellite and the terrestrial station may alternatively be determined by the terrestrial station.

Another method for determining a segmentation point of a digital processing operation provided in an embodiment of this application is described below by using an example in which a first communication apparatus is a terrestrial station and a second communication apparatus is a satellite.

Figures 7, 8:
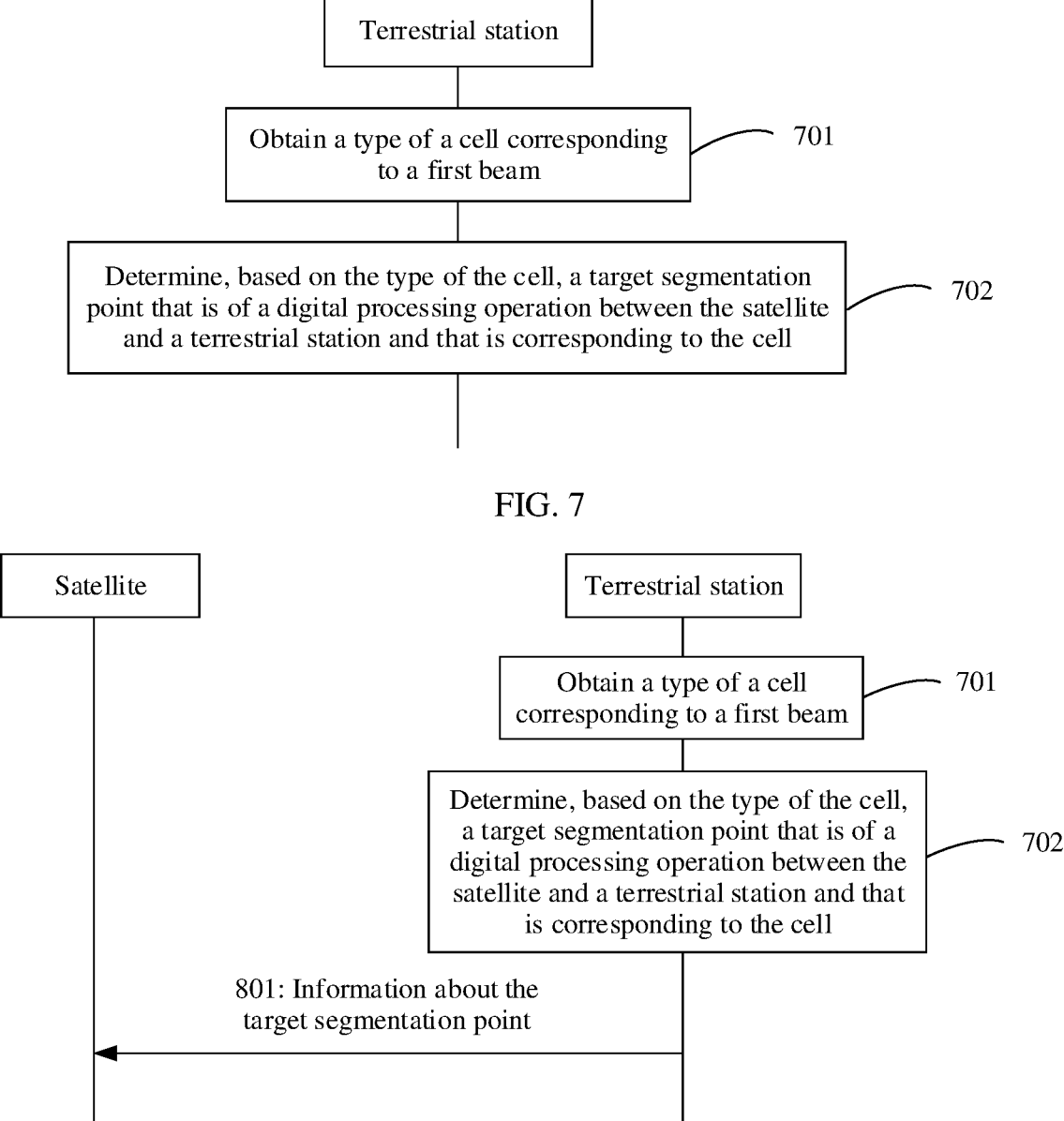
FIG. 7 is a schematic flowchart of another method for determining a segmentation point of a digital processing operation according to an embodiment of this application.
FIG. 8 is a schematic flowchart of another method for determining a segmentation point of a digital processing operation according to an embodiment of this application.

FIG. 7 shows another method for determining a segmentation point of a digital processing operation according to an embodiment of this application. The method for determining a segmentation point of a digital processing operation includes step 701 and step 702.

Step 701: A terrestrial station obtains a type of a cell corresponding to a first beam.

The terrestrial station may be the terrestrial station 102 in FIG. 1A. The first beam may be any one of a plurality of beams of a satellite. The satellite may be the satellite 101 in FIG. 1A.

The type of the cell corresponding to the first beam includes an IoT cell, a high-speed cell, an access point cell, or a hotspot cell. For descriptions of the IoT cell, the high-speed cell, the access point cell, or the hotspot cell, refer to descriptions of step 301. Details are not described again.

Optionally, the type of the cell corresponding to the first beam is determined based on location information of the cell. The location information of the cell is used to indicate a geographical location of the cell.

In a possible implementation, the terrestrial station obtains the location information of the cell, and the terrestrial station determines the type of the cell based on the location information of the cell.

Further, the terrestrial station receives the location information of the cell from the satellite, and determines the type of the cell based on the location information of the cell. There is a correspondence between the location information of the cell and the type of the cell. The correspondence may be pre-stored in the terrestrial station. For descriptions of the correspondence, refer to descriptions of step 301. Details are not described again.

It may be understood that the terrestrial station may further receive information about the type of the cell from the satellite. The information about the type of the cell is used to indicate the type of the cell. For example, the terrestrial station sends request information to the satellite, and the request information is used to request the type of the cell. After receiving the request information, the satellite obtains the type of the cell from a network device in the cell or a terminal in the cell, and sends the information about the type of the cell to the terrestrial station.

The satellite has a feature of moving at a high speed. Therefore, the location information of the cell corresponding to the first beam continuously changes. The terrestrial station may obtain, when the location information of the cell corresponding to the first beam changes, the type of the cell corresponding to the first beam. Alternatively, the terrestrial station periodically obtains the type of the cell corresponding to the first beam.

Step 702: The terrestrial station determines, based on the type of the cell, a target segmentation point that is of a digital processing operation between the satellite and the terrestrial station and that is corresponding to the cell.

For a specific process of step 702, refer to corresponding descriptions in step 302 in which the satellite determines, based on the type of the cell, the target segmentation point that is of the digital processing operation between the satellite and the terrestrial station and that is corresponding to the cell. Details are not described.

Based on the method shown in FIG. 7, the terrestrial station may obtain the type of the cell corresponding to the first beam, and determine, based on the type of the cell, the target segmentation point that is of the digital processing operation between the satellite and the terrestrial station and that is corresponding to the cell. In this way, for data of the cell, the terrestrial station may exchange the data with the satellite based on the target segmentation point, and the terrestrial station and the satellite jointly complete the digital processing operation. In addition, the satellite includes a plurality of beams, and a terminal in a cell corresponding to each beam has a different requirement, and therefore, a segmentation point of a digital processing operation corresponding to the cell corresponding to each beam may also be different. In the method shown in FIG. 7, the terrestrial station may determine a target segmentation point for the cell corresponding to each beam, so that each cell performs communication by using a corresponding target segmentation point, to meet a requirement of a terminal in each cell.

Further optionally, after determining the target segmentation point, the terrestrial station may indicate the target segmentation point to the satellite. In this way, the satellite may also know the target segmentation point. Specifically, as shown in FIG. 8, the method shown in FIG. 7 further includes step 801.

Step 801: The terrestrial station sends information about the target segmentation point to the satellite.

The information about the target segmentation point is used to indicate the target segmentation point. For example, the information about the target segmentation point includes an identifier of the target segmentation point, such as a segmentation point 1.

In a possible implementation, the target segmentation point is the same as a current segmentation point that is of the digital processing operation between the satellite and the terrestrial station and that is corresponding to the cell, and the terrestrial station exchanges data with the satellite by using the current segmentation point. In this case, the terrestrial station may alternatively not send the information about the target segmentation point to the satellite.

In another possible implementation, the target segmentation point is different from the current segmentation point. The terrestrial station changes the current segmentation point to the target segmentation point; the terrestrial station receives a first complete message from the satellite; and the terrestrial station sends a second complete message to the satellite. Specifically, refer to descriptions in the following method shown in FIG. 9.

Correspondingly, the satellite receives the information about the target segmentation point from the terrestrial station. Subsequently, the satellite may determine the target segmentation point based on the information about the target segmentation point, and exchange data with the terrestrial station based on the target segmentation point.

In a possible implementation, the target segmentation point is the same as the current segmentation point, and the satellite exchanges data with the terrestrial station by using the current segmentation point.

In another possible implementation, the target segmentation point is different from the current segmentation point. The satellite changes the current segmentation point to the target segmentation point; the satellite sends a first complete message to the terrestrial station; and the satellite receives a second complete message from the terrestrial station. Specifically, refer to descriptions in the following method shown in FIG. 9.

Based on the method shown in FIG. 8, the terrestrial station may send the information about the target segmentation point to the satellite. In this way, both the satellite and the terrestrial station know the target segmentation point. Subsequently, for data of the cell, the satellite and the terrestrial station may exchange the data based on the target segmentation point, and jointly complete the digital processing operation.

Figure 9:
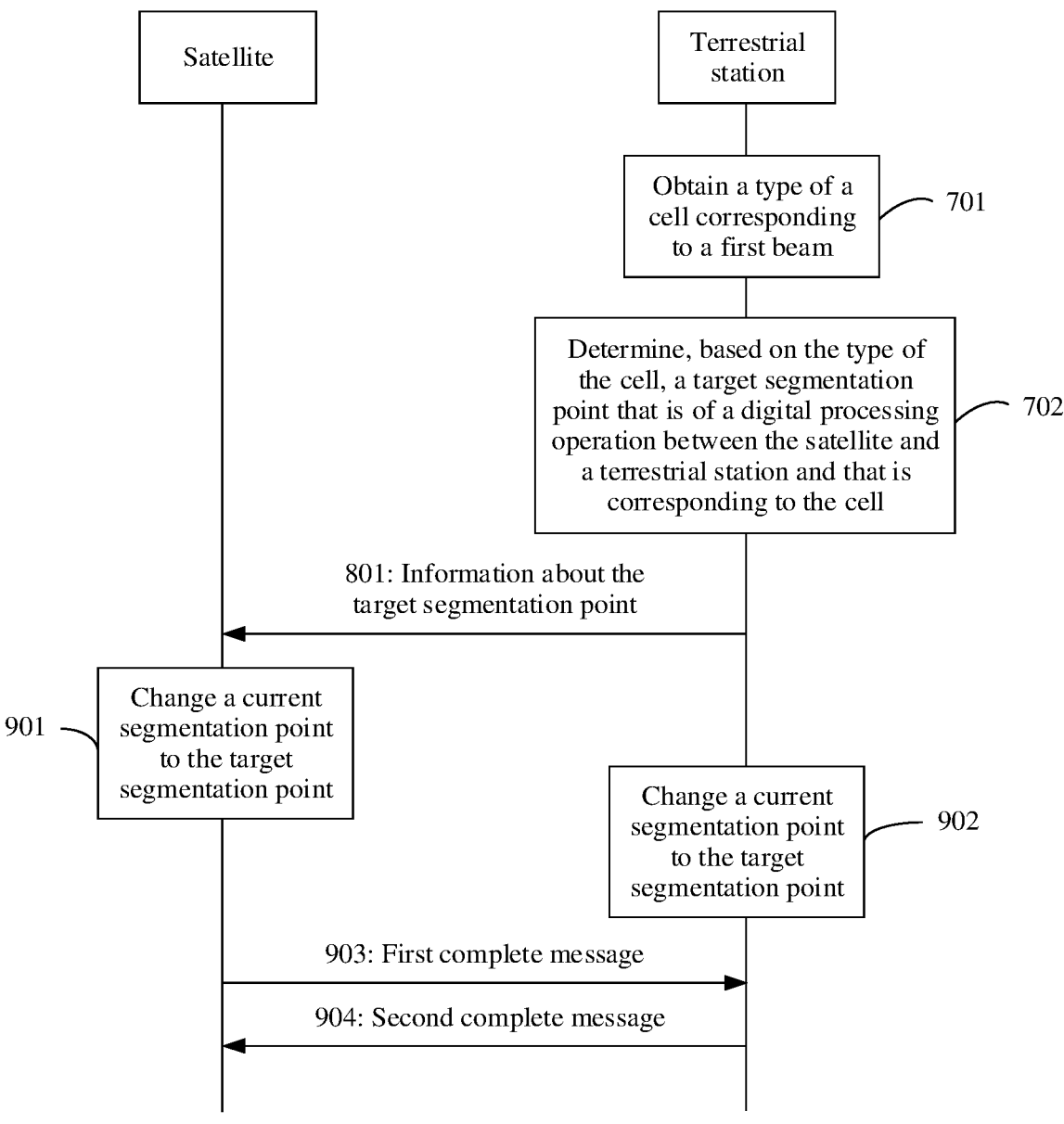
FIG. 9 is a schematic flowchart of another method for determining a segmentation point of a digital processing operation according to an embodiment of this application.

Further, in a possible implementation of the method shown in FIG. 7, if the target segmentation point is different from the current segmentation point, the satellite and the terrestrial station may change the current segmentation point to the target segmentation point, and subsequently exchange data based on the target segmentation point. Specifically, as shown in FIG. 9, the method shown in FIG. 8 further includes step 901 to step 904.

Step 901: The satellite changes the current segmentation point to the target segmentation point.

Step 902: The terrestrial station changes the current segmentation point to the target segmentation point.

Step 903: The satellite sends a first complete message to the terrestrial station.

Step 904: The terrestrial station sends a second complete message to the satellite.

For specific descriptions of step 901 to step 904, refer to descriptions of step 501 to step 504. Details are not described.

Based on the method shown in FIG. 9, if the target segmentation point is different from the current segmentation point of the cell, the satellite and the terrestrial station may change the current segmentation point to the target segmentation point, and notify the other party that the current segmentation point has been changed to the target segmentation point. Subsequently, for data of the cell, the satellite and the terrestrial station may exchange the data based on the target segmentation point. In this way, before the target segmentation point is determined next time, after receiving a signal from a terminal in the cell, the satellite may exchange data with the terrestrial station based on the target segmentation point determined this time.

Figure 10:
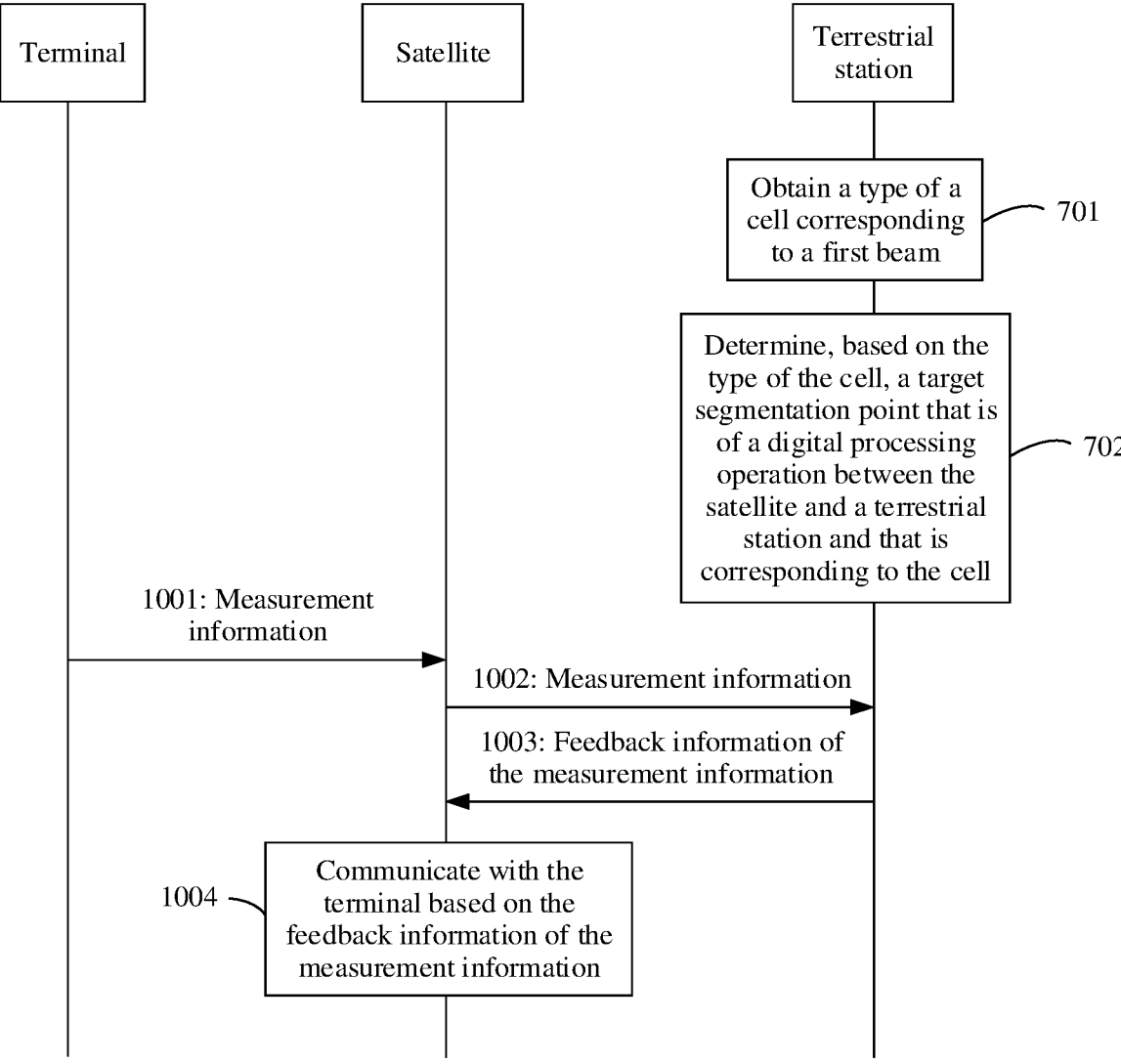
FIG. 10 is a schematic flowchart of another method for determining a segmentation point of a digital processing operation according to an embodiment of this application.

Optionally, in a possible implementation of the method shown in FIG. 7, if the type of the cell is a hotspot cell, and the hotspot cell has a relatively large service volume, and out of consideration of a size, costs, energy consumption, and the like, a digital processing capability on the satellite is limited, and consequently, a delay during communication is relatively large or a throughput is relatively low. Therefore, the satellite may further receive measurement information from the terminal, and send the measurement information to the terrestrial station, so that the terrestrial station assists, by using a signal processing algorithm such as a closed-loop precoding algorithm or a closed-loop scheduling algorithm, the satellite in improving network performance (for example, reduce a delay or increase a throughput). Specifically, as shown in FIG. 10, the method shown in FIG. 7 further includes step 1001 to step 1004.

Step 1001: The satellite receives measurement information from a terminal.

Step 1002: The satellite sends the measurement information to the terrestrial station.

Step 1003: The terrestrial station receives the measurement information from the satellite, and sends feedback information of the measurement information to the satellite.

Step 1004: The satellite receives the feedback information of the measurement information from the terrestrial station, and communicates with the terminal based on the feedback information of the measurement information.

For specific descriptions of step 1001 to step 1004, refer to descriptions of step 601 to step 604. Details are not described.

Based on the method shown in FIG. 10, the satellite may receive the measurement information from the terminal, and send the measurement information from the terminal to the terrestrial station. The satellite may further receive the feedback information of the measurement information from the terrestrial station, and adjust the first beam based on the feedback information of the measurement information, so that the first beam is targeted at the terminal; or the terminal in the cell corresponding to the first beam is scheduled based on the feedback information of the measurement information. In this way, network performance and transmission efficiency can be improved.

Figures 11, 12:
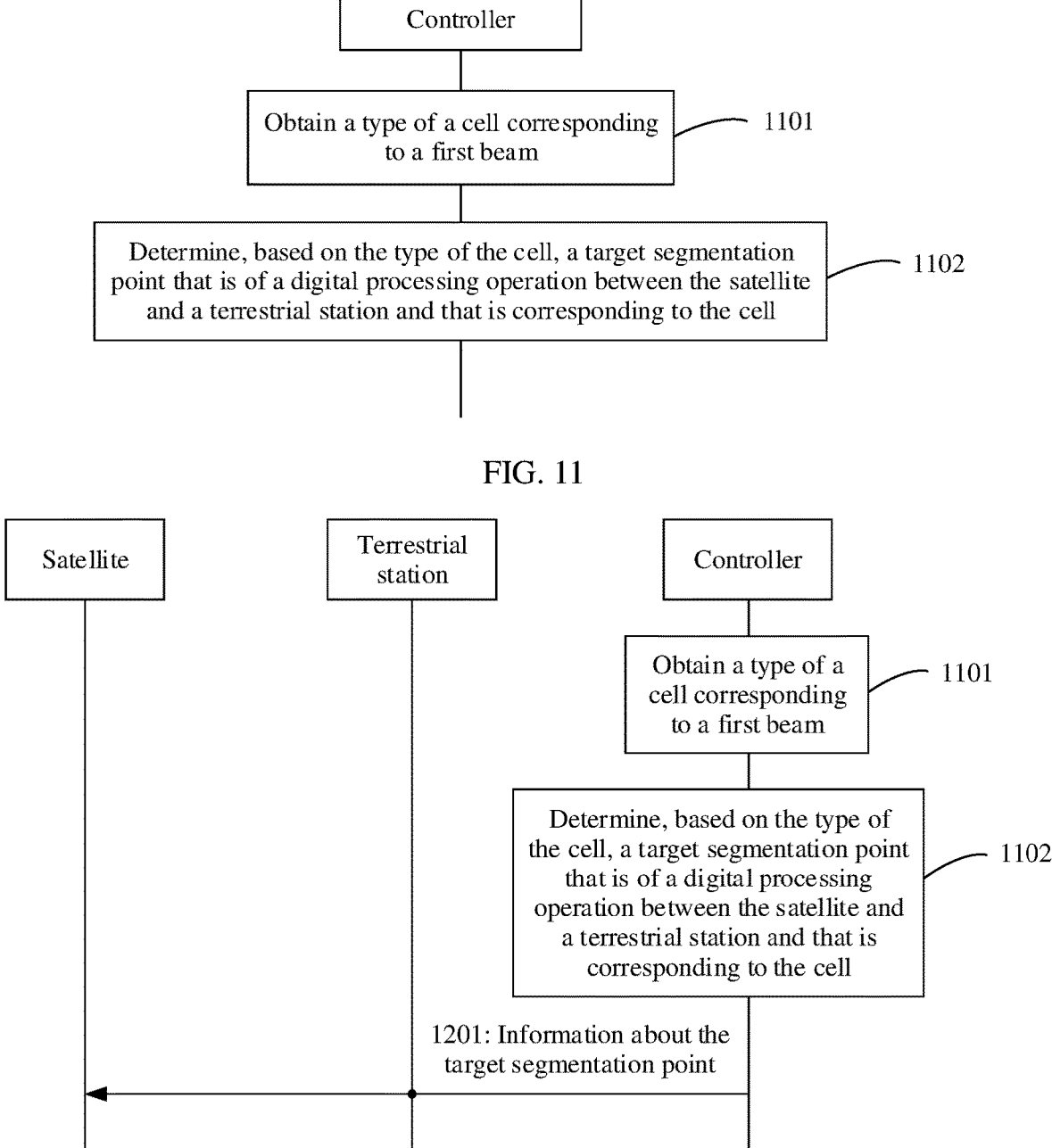
FIG. 11 is a schematic flowchart of another method for determining a segmentation point of a digital processing operation according to an embodiment of this application.
FIG. 12 is a schematic flowchart of another method for determining a segmentation point of a digital processing operation according to an embodiment of this application.

In the methods shown in FIG. 3 to FIG. 6, the segmentation point of the digital processing operation between the satellite and the terrestrial station is determined by the satellite. In the methods shown in FIG. 7 to FIG. 10, the segmentation point of the digital processing operation between the satellite and the terrestrial station is determined by the terrestrial station. In addition, the segmentation point may alternatively be determined by a controller. For example, FIG. 11 shows another method for determining a segmentation point of a digital processing operation according to an embodiment of this application. The method for determining a segmentation point of a digital processing operation includes step 1101 and step 1102.

Step 1101: A controller obtains a type of a cell corresponding to a first beam.

The controller may be the controller described in the foregoing descriptions corresponding to FIG. 1A. The first beam may be any one of a plurality of beams corresponding to a satellite. The satellite may be the satellite 101 in FIG. 1A. For descriptions of an association relationship between the type of the cell and a type of a terminal in the cell, refer to descriptions of step 301. Details are not described.

For a specific process in which the controller obtains the type of the cell corresponding to the first beam, refer to corresponding descriptions in step 701 in which the terrestrial station obtains the type of the cell corresponding to the first beam. Details are not described.

Step 1102: The controller determines, based on the type of the cell, a target segmentation point that is of a digital processing operation between the satellite and a terrestrial station and that is corresponding to the cell.

For a specific process of step 1102, refer to corresponding descriptions in step 302 in which the satellite determines, based on the type of the cell, the target segmentation point that is of the digital processing operation between the satellite and the terrestrial station and that is corresponding to the cell. Details are not described.

Based on the method shown in FIG. 11, the controller may obtain the type of the cell corresponding to the first beam, and determine, based on the type of the cell, the target segmentation point that is of the digital processing operation between the satellite and the terrestrial station and that is corresponding to the cell. In this way, the controller may determine, for the satellite and the terrestrial station, the target segmentation point corresponding to the cell corresponding to the first beam. Subsequently, for data of the cell, the satellite may exchange the data with the terrestrial station based on the target segmentation point, and the satellite and the terrestrial station jointly complete the digital processing operation. In addition, the satellite includes a plurality of beams, and a terminal in a cell corresponding to each beam has a different requirement, and therefore, a requirement for a segmentation point of a digital processing operation corresponding to the cell corresponding to each beam is also different. In the method shown in FIG. 11, the controller may determine a target segmentation point for the cell corresponding to each beam, so that each cell performs communication by using a corresponding target segmentation point, to meet a requirement of a terminal in each cell.

Further optionally, after determining the target segmentation point, the controller may indicate the target segmentation point to the satellite and the terrestrial station. In this way, the satellite and the terrestrial station may also know the target segmentation point. Specifically, as shown in FIG. 12, the method shown in FIG. 11 further includes step 1201.

Step 1201: The controller sends information about the target segmentation point to the satellite and the terrestrial station.

The terrestrial station may be the terrestrial station 102 in FIG. 1A. The information about the target segmentation point is used to indicate the target segmentation point. For example, the information about the target segmentation point includes an identifier of the target segmentation point, such as a segmentation point 1.

Optionally, the controller may simultaneously send the information about the target segmentation point to the satellite and the terrestrial station; the controller may first send the information about the target segmentation point to the satellite, and then send the information about the target segmentation point to the terrestrial station; or the controller may first send the information about the target segmentation point to the terrestrial station, and then send the information about the target segmentation point to the satellite.

In a possible implementation, the target segmentation point is the same as a current segmentation point that is of the digital processing operation between the satellite and the terrestrial station and that is corresponding to the cell, and the terrestrial station exchanges data with the satellite by using the current segmentation point. In this case, the controller may alternatively not send the information about the target segmentation point to the satellite and the terrestrial station.

In another possible implementation, the target segmentation point is different from the current segmentation point, and the controller further needs to indicate the satellite and the terrestrial station to change the current segmentation point to the target segmentation point. For example, the controller sends a segmentation start message to the satellite and the terrestrial station; the controller receives a first complete message from the satellite; the controller receives a second complete message from the terrestrial station; and the controller sends a segmentation execute message to the satellite and the terrestrial station. Specifically, refer to descriptions in the following method shown in FIG. 13.

Correspondingly, the satellite receives the information about the target segmentation point from the controller. In this way, the satellite also knows the target segmentation point of the digital processing operation between the satellite and the terrestrial station. Subsequently, the satellite may configure the satellite based on the information about the target segmentation point, and the satellite may further exchange data with the terrestrial station based on the target segmentation point.

In a possible implementation, the target segmentation point is the same as the current segmentation point of the cell, and the satellite exchanges data with the terrestrial station by using the current segmentation point.

In another possible implementation, the target segmentation point is different from the current segmentation point of the cell. The satellite needs to change the current segmentation point to the target segmentation point, and exchange data with the terrestrial station by using the target segmentation point. For example, the satellite receives a segmentation start message from the controller; the satellite sends a first complete message to the controller; and the satellite receives a segmentation execute message from the controller. Specifically, refer to descriptions in the following method shown in FIG. 13.

Correspondingly, the terrestrial station receives the information about the target segmentation point from the controller. In this way, the terrestrial station also knows the target segmentation point of the digital processing operation between the satellite and the terrestrial station. Subsequently, the terrestrial station may configure the terrestrial station based on the information about the target segmentation point, and the terrestrial station may further exchange data with the satellite based on the target segmentation point.

In a possible implementation, the target segmentation point is the same as the current segmentation point of the cell, and the terrestrial station exchanges data with the terrestrial station by using the current segmentation point.

In another possible implementation, the target segmentation point is different from the current segmentation point of the cell. The terrestrial station needs to change the current segmentation point to the target segmentation point, and exchange data with the satellite by using the target segmentation point. For example, the terrestrial station receives a segmentation start message from the controller; the terrestrial station sends a second complete message to the controller; and the terrestrial station receives a segmentation execute message from the controller. Specifically, refer to descriptions in the following method shown in FIG. 13.

Based on the method shown in FIG. 12, the controller may send the information about the target segmentation point to the satellite and the terrestrial station. In this way, both the satellite and the terrestrial station know the target segmentation point of the digital processing operation between the satellite and the terrestrial station. Subsequently, for data of the cell, the satellite and the terrestrial station may exchange the data based on the target segmentation point, and jointly complete the digital processing operation.

Figure 13:
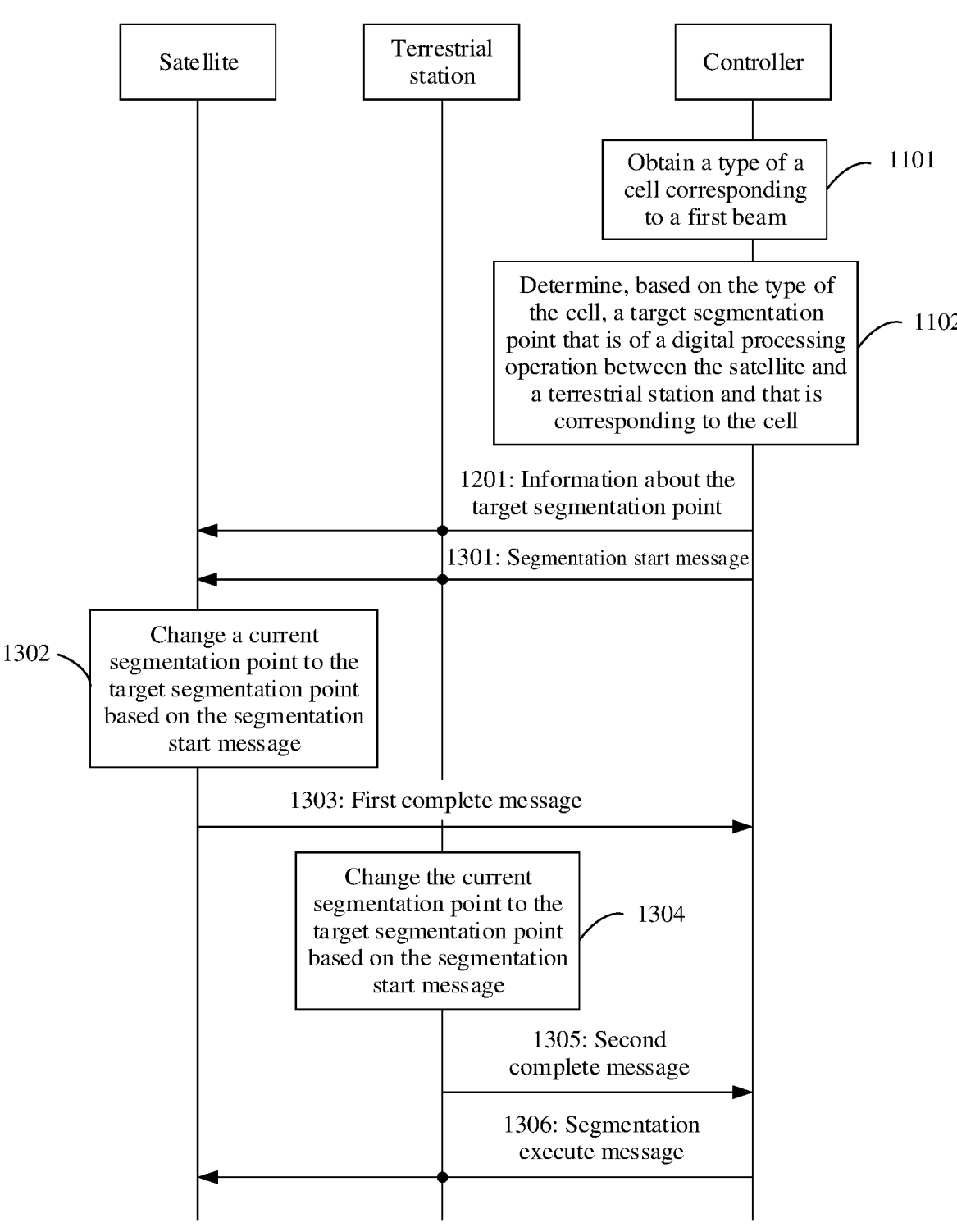
FIG. 13 is a schematic flowchart of another method for determining a segmentation point of a digital processing operation according to an embodiment of this application.

Further, in a possible implementation of the method shown in FIG. 11, if the target segmentation point is different from the current segmentation point of the cell, as shown in FIG. 13, the method shown in FIG. 12 further includes step 1301 to step 1306.

Step 1301: The controller sends a segmentation start message to the satellite and the terrestrial station.

The segmentation start message may be used to indicate to change the current segmentation point to the target segmentation point. For example, the segmentation start message includes 1-bit indication information, and the 1-bit indication information indicates to change the current segmentation point to the target segmentation point.

It should be noted that the information about the target segmentation point may also be included in the segmentation start message and sent to the satellite and the terrestrial station. In this way, the controller may not need to separately send the information about the target segmentation point to the satellite and the terrestrial station, so that signaling overheads can be reduced.

Optionally, the controller may simultaneously send the segmentation start message to the satellite and the terrestrial station; the controller may first send the segmentation start message to the satellite, and then send the segmentation start message to the terrestrial station; or the controller may first send the segmentation start message to the terrestrial station, and then send the segmentation start message to the satellite.

Step 1302: The satellite receives the segmentation start message from the controller, and changes the current segmentation point to the target segmentation point based on the segmentation start message.

For a process in which the satellite changes the current segmentation point to the target segmentation point, refer to descriptions in step 501. Details are not described.

Step 1303: The satellite sends a first complete message to the controller.

The first complete message may be used to indicate that the satellite has changed the current segmentation point to the target segmentation point. For example, the first complete message includes 1-bit indication information, and the 1-bit indication information indicates that the satellite has changed the current segmentation point to the target segmentation point.

Correspondingly, the controller receives the first complete message from the satellite.

Optionally, after receiving the first complete message, the controller sends a first acknowledgment message to the satellite. The first acknowledgment message is used to indicate that the controller receives the first complete message.

Optionally, if the controller does not receive the first complete message in a preset period of time, the controller sends the segmentation start message to the satellite again.

Step 1304: The terrestrial station receives the segmentation start message from the controller, and changes the current segmentation point to the target segmentation point based on the segmentation start message.

For a process in which the terrestrial station changes the current segmentation point to the target segmentation point, refer to descriptions in step 502. Details are not described.

Step 1305: The terrestrial station sends a second complete message to the controller.

The second complete message may be used to indicate that the terrestrial station has changed the current segmentation point to the target segmentation point. For example, the second complete message includes 1-bit indication information, and the 1-bit indication information indicates that the terrestrial station has changed the current segmentation point to the target segmentation point.

Correspondingly, the controller receives the second complete message from the terrestrial station.

Optionally, after receiving the second complete message, the controller sends a second acknowledgment message to the terrestrial station. The second acknowledgment message is used to indicate that the controller receives the second complete message.

Optionally, if the controller does not receive the second complete message in a preset period of time, the controller sends the segmentation start message to the terrestrial station again.

Step 1306: The controller sends a segmentation execute message to the satellite and the terrestrial station.

The segmentation execute message may be used to indicate to process a signal based on the target segmentation point. For example, the segmentation execute message includes 1-bit indication information, and the 1-bit indication information indicates to process the signal based on the target segmentation point.

Optionally, the controller may simultaneously send the segmentation execute message to the satellite and the terrestrial station; the controller may first send the segmentation execute message to the satellite, and then send the segmentation execute message to the terrestrial station; or the controller may first send the segmentation execute message to the terrestrial station, and then send the segmentation execute message to the satellite.

Correspondingly, the satellite receives the segmentation execute message from the controller. Subsequently, for data of the cell, the satellite may exchange the data with the terrestrial station based on the target segmentation point.

Correspondingly, the terrestrial station receives the segmentation execute message from the controller. Subsequently, for data of the cell, the terrestrial station may exchange the data with the satellite based on the target segmentation point.

It should be noted that an execution sequence of step 1302 to step 1305 is not limited in this embodiment of this application provided that step 1303 is performed after step 1302 and step 1305 is performed after step 1304. For example, in this embodiment of this application, step 1302 may be performed first, then step 1304 is performed, then step 1303 is performed, and step 1305 is performed finally.

In this embodiment of this application, alternatively, step 1304 may be performed first, then step 1305 is performed, then step 1302 is performed, and step 1303 is performed finally. In this embodiment of this application, alternatively, step 1304 may be performed first, then step 1302 is performed, then step 1303 is performed, and step 1305 is performed finally.

Based on the method shown in FIG. 13, if the target segmentation point is different from the current segmentation point of the cell, the controller may indicate the satellite and the terrestrial station to change the current segmentation point to the target segmentation point. After receiving the complete messages of the satellite and the terrestrial station, the controller indicates that the satellite and the terrestrial station exchange data based on the target segmentation point for the data of the cell in subsequent communication. In this way, before the target segmentation point is determined next time, after receiving a signal from a terminal in the cell, the satellite may exchange data with the terrestrial station based on the target segmentation point determined this time.

Figure 14:
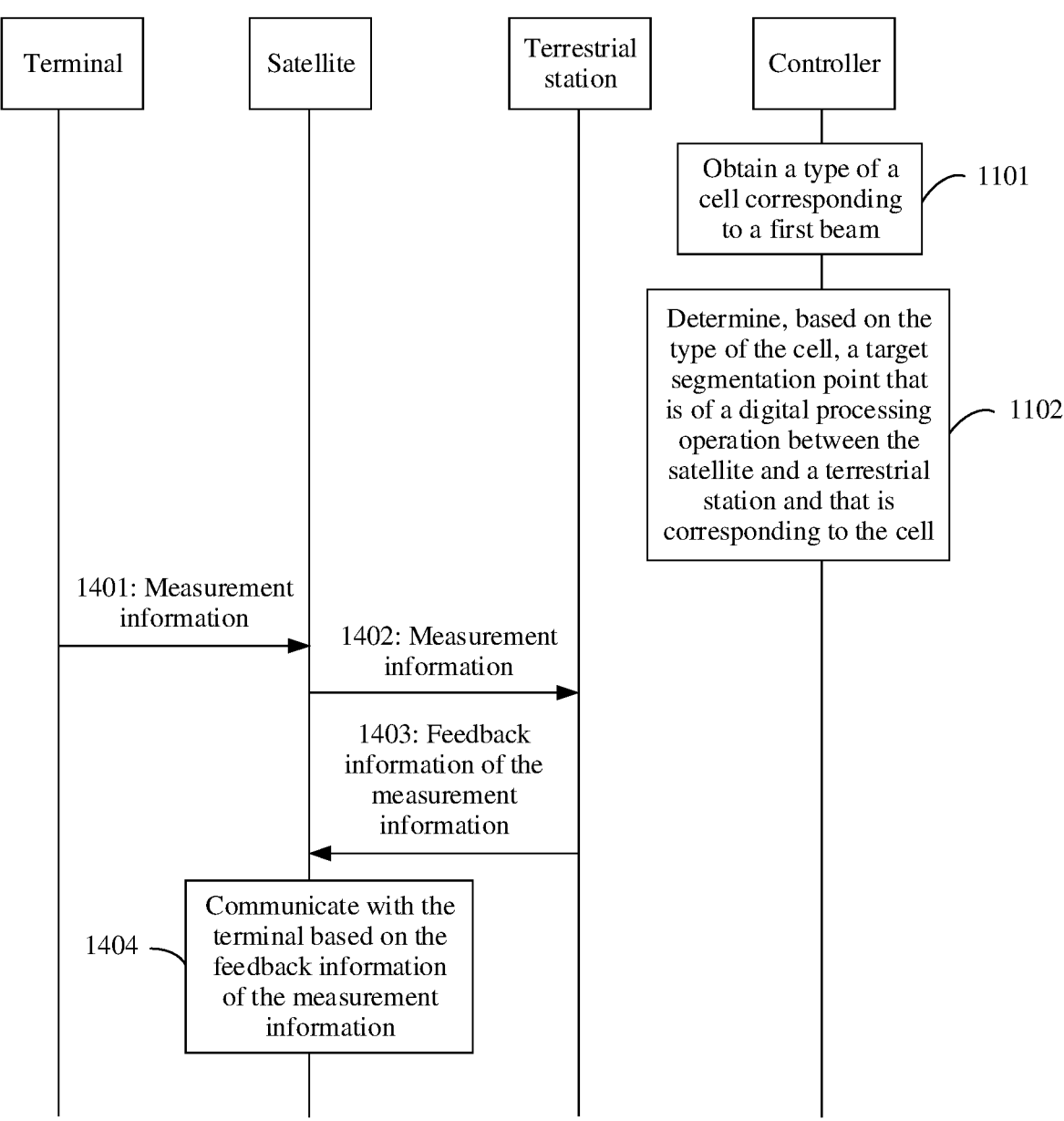
FIG. 14 is a schematic flowchart of another method for determining a segmentation point of a digital processing operation according to an embodiment of this application.

Optionally, in a possible implementation of the method shown in FIG. 11, if the type of the cell is a hotspot cell, and the hotspot cell has a relatively large service volume, and out of consideration of a size, costs, energy consumption, and the like, a digital processing capability on the satellite is limited, and consequently, a delay during communication is relatively large or a throughput is relatively low. Therefore, the satellite may further receive measurement information from the terminal, and send the measurement information to the terrestrial station, so that the terrestrial station assists, by using a signal processing algorithm such as a closed-loop precoding algorithm or a closed-loop scheduling algorithm, the satellite in improving network performance (for example, reduce a delay or increase a throughput). Specifically, as shown in FIG. 14, the method shown in FIG. 11 further includes step 1401 to step 1404.

Step 1401: The satellite receives measurement information from a terminal.

Step 1402: The satellite sends the measurement information to the terrestrial station.

Step 1403: The terrestrial station receives the measurement information from the satellite, and sends feedback information of the measurement information to the satellite.

Step 1404: The satellite receives the feedback information of the measurement information from the terrestrial station, and communicates with the terminal based on the feedback information of the measurement information.

For specific descriptions of step 1401 to step 1404, refer to descriptions of step 601 to step 604. Details are not described.

Based on the method shown in FIG. 14, the satellite may receive the measurement information from the terminal, and send the measurement information from the terminal to the terrestrial station. The satellite may further receive the feedback information of the measurement information from the terrestrial station, and adjust the first beam based on the feedback information of the measurement information, so that the first beam is targeted at the terminal; or the terminal in the cell corresponding to the first beam is scheduled based on the feedback information of the measurement information. In this way, network performance and transmission efficiency can be improved.

The foregoing mainly describes the solutions provided in embodiments of this application from the perspective of interaction between network elements. It may be understood that, to implement the foregoing functions, the satellite, the terrestrial station, or the controller includes a corresponding hardware structure and/or a corresponding software module that perform/performs the functions. A person skilled in the art should be easily aware that units, algorithms, and steps in the examples described with reference to the embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In embodiments of this application, the satellite, the terrestrial station, or the controller may be divided into function modules based on the foregoing method examples. For example, each function module corresponding to each function may be obtained through division, or two or more functions may be integrated into one processing module. The integrated module may be implemented in a form of hardware, or may be implemented in a form of a software function module. It should be noted that, in embodiments of this application, division into the modules is an example and is merely logical function division, and may be other division in an actual implementation.

Figure 15:
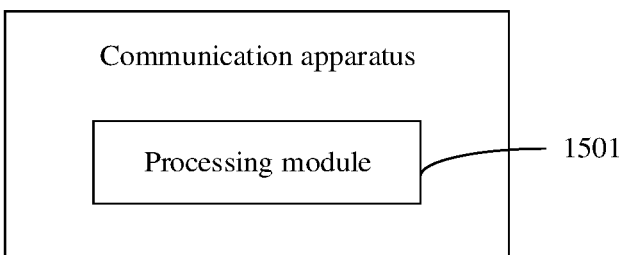
FIG. 15 is a schematic diagram of a structure of a communication apparatus according to an embodiment of this application.

For example, when function modules are obtained through division in an integrated manner, FIG. 15 is a schematic diagram of a structure of a communication apparatus. The communication apparatus may be a satellite or a chip or a system-on-a-chip in the satellite, or another combined component, part, or the like that can implement the functions of the satellite, and the communication apparatus may be configured to perform the functions of the satellite in the foregoing embodiments. Alternatively, the communication apparatus may be a terrestrial station or a chip or a system-on-a-chip in the terrestrial station, or another combined component, part, or the like that can implement the functions of the terrestrial station, and the communication apparatus may be configured to perform the functions of the terrestrial station in the foregoing embodiments.

In a possible implementation, the communication apparatus shown in FIG. 15 includes a processing module 1501.

The processing module 1501 is configured to obtain a type of a cell corresponding to a first beam of a satellite, where the first beam is any one of a plurality of beams of the satellite, and the type of the cell is determined based on location information of the cell. For example, with reference to FIG. 3, the processing module 1501 may be configured to perform step 301.

The processing module 1501 is further configured to determine, based on the type of the cell, a target segmentation point corresponding to the cell, where the target segmentation point is a target segmentation point of a digital processing operation between the communication apparatus and a second communication apparatus. For example, with reference to FIG. 3, the processing module 1501 may be configured to perform step 302.

Figure 16:
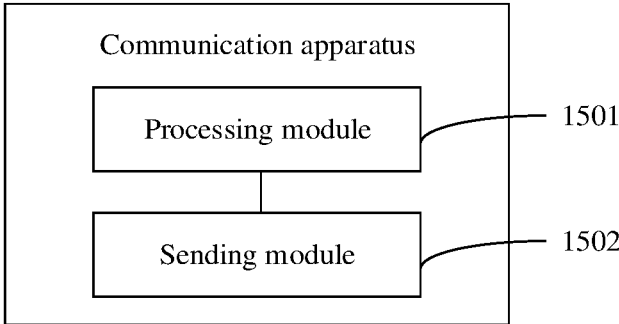
FIG. 16 is a schematic diagram of a structure of another communication apparatus according to an embodiment of this application.

Optionally, as shown in FIG. 16, the communication apparatus further includes a sending module 1502. The sending module 1502 is configured to send information about the target segmentation point to the second communication apparatus, where the information about the target segmentation point is used to indicate the target segmentation point.

Figure 17:
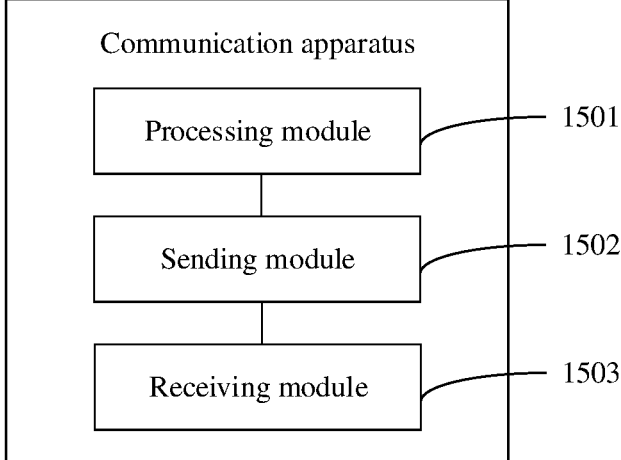
FIG. 17 is a schematic diagram of a structure of another communication apparatus according to an embodiment of this application.

Optionally, as shown in FIG. 17, the communication apparatus further includes a receiving module 1503. The target segmentation point is different from a current segmentation point that is of the digital processing operation between the communication apparatus and the second communication apparatus and that is corresponding to the cell. The processing module 1501 is further configured to change the current segmentation point to the target segmentation point. The sending module 1502 is further configured to send a first complete message to the second communication apparatus, where the first complete message is used to indicate that the communication apparatus has changed the current segmentation point to the target segmentation point. The receiving module 1503 is further configured to receive a second complete message from the second communication apparatus, where the second complete message is used to indicate that the second communication apparatus has changed the current segmentation point to the target segmentation point.

Optionally, the type of the cell includes an IoT cell, a high-speed cell, an access point cell, or a hotspot cell.

Optionally, the communication apparatus is a satellite, the second communication apparatus is a terrestrial station, and the type of the cell is a hotspot cell. The receiving module 1503 is further configured to receive measurement information from a terminal, where the terminal is a terminal in the cell, and the measurement information is used to indicate quality of a channel between the communication apparatus and the terminal. The sending module 1502 is further configured to send the measurement information to the second communication apparatus. The receiving module 1503 is further configured to receive feedback information of the measurement information from the second communication apparatus. The processing module 1501 is further configured to communicate with the terminal based on the feedback information of the measurement information.

Optionally, the feedback information of the measurement information is used to adjust the first beam; or the feedback information of the measurement information is used to schedule a terminal in the cell.

All related content of the operations in the foregoing method embodiments may be cited in function descriptions of the corresponding function modules. Details are not described herein again.

In this embodiment, the communication apparatus is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus may use a form shown in FIG. 2.

For example, the processor 201 in FIG. 2 may invoke the computer-executable instructions stored in the memory 203, so that the communication apparatus performs the method for determining a segmentation point of a digital processing operation in the foregoing method embodiments.

For example, a function/implementation process of the processing module 1501, the sending module 1502, and the receiving module 1503 in FIG. 17 may be implemented by the processor 201 in FIG. 2 by invoking the computer-executable instruction stored in the memory 203. Alternatively, a function/implementation process of the processing module 1501 in FIG. 17 may be implemented by the processor 201 in FIG. 2 by invoking the computer-executable instruction stored in the memory 203, and a function/implementation process of the sending module 1502 and the receiving module 1503 in FIG. 17 may be implemented by the communication interface 204 in FIG. 2.

Because the communication apparatus provided in this embodiment may perform the foregoing method for determining a segmentation point of a digital processing operation, for a technical effect that can be achieved by the communication apparatus, refer to the foregoing method embodiments. Details are not described herein again.

Figure 18:
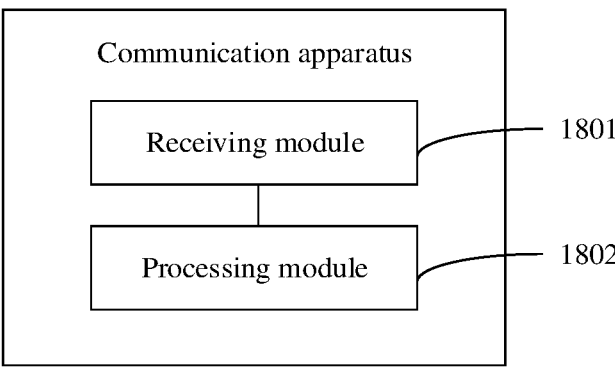
FIG. 18 is a schematic diagram of a structure of another communication apparatus according to an embodiment of this application.

For example, when function modules are obtained through division in an integrated manner, FIG. 18 is a schematic diagram of a structure of a communication apparatus. The communication apparatus may be a terrestrial station or a chip or a system-on-a-chip in the terrestrial station, or another combined component, part, or the like that can implement the functions of the terrestrial station, and the communication apparatus may be configured to perform the functions of the terrestrial station in the foregoing embodiments. Alternatively, the communication apparatus may be a satellite or a chip or a system-on-a-chip in the satellite, or another combined component, part, or the like that can implement the functions of the satellite, and the communication apparatus may be configured to perform the functions of the satellite in the foregoing embodiments.

In a possible implementation, the communication apparatus shown in FIG. 18 includes a receiving module 1801 and a processing module 1802.

The receiving module 1801 is configured to receive information about a target segmentation point from a first communication apparatus, where the information about the target segmentation point is used to indicate a target segmentation point corresponding to a cell, the cell is a cell corresponding to a first beam, the first beam is any one of a plurality of beams of a satellite, and the target segmentation point is a target segmentation point of a digital processing operation between the first communication apparatus and the communication apparatus. For example, with reference to FIG. 4, the receiving module 1801 may be configured to perform step 401.

The processing module 1802 is configured to determine the target segmentation point based on the information about the target segmentation point.

Figure 19:
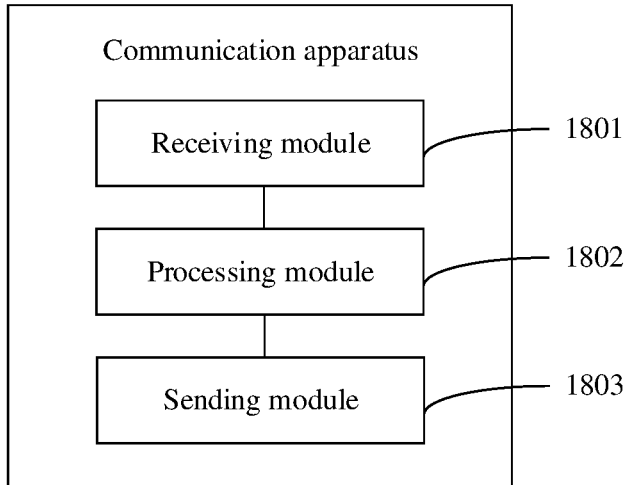
FIG. 19 is a schematic diagram of a structure of another communication apparatus according to an embodiment of this application.

Optionally, as shown in FIG. 19, the communication apparatus further includes a sending module 1803. The target segmentation point is different from a current segmentation point that is of the digital processing operation between the first communication apparatus and the communication apparatus and that is corresponding to the cell. The processing module 1802 is further configured to change the current segmentation point to the target segmentation point. The receiving module 1801 is further configured to receive a first complete message from the first communication apparatus, where the first complete message is used to indicate that the first communication apparatus has changed the current segmentation point to the target segmentation point. The sending module 1803 is further configured to send a second complete message to the first communication apparatus, where the second complete message is used to indicate that the communication apparatus has changed the current segmentation point to the target segmentation point.

Optionally, the type of the cell includes an IoT cell, a high-speed cell, an access point cell, or a hotspot cell.

Optionally, the first communication apparatus is a satellite, the communication apparatus is a terrestrial station, and the type of the cell is a hotspot cell. The receiving module 1801 is further configured to receive measurement information from the first communication apparatus, where the measurement information is used to indicate quality of a channel between the first communication apparatus and a terminal, and the terminal is a terminal in the cell. The processing module 1802 is further configured to send feedback information of the measurement information to the first communication apparatus based on the measurement information.

Optionally, the feedback information of the measurement information is used to adjust the first beam; or the feedback information of the measurement information is used to schedule a terminal in the cell.

All related content of the operations in the foregoing method embodiments may be cited in function descriptions of the corresponding function modules. Details are not described herein again.

In this embodiment, the communication apparatus is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus may use a form shown in FIG. 2.

For example, the processor 201 in FIG. 2 may invoke the computer-executable instructions stored in the memory 203, so that the communication apparatus performs the method for determining a segmentation point of a digital processing operation in the foregoing method embodiments.

For example, a function/implementation process of the receiving module 1801, the processing module 1802, and the sending module 1803 in FIG. 19 may be implemented by the processor 201 in FIG. 2 by invoking the computer-executable instruction stored in the memory 203. Alternatively, a function/implementation process of the processing module 1802 in FIG. 19 may be implemented by the processor 201 in FIG. 2 by invoking the computer-executable instruction stored in the memory 203, and a function/implementation process of the receiving module 1801 and the sending module 1803 in FIG. 19 may be implemented by the communication interface 204 in FIG. 2.

Because the communication apparatus provided in this embodiment may perform the foregoing method for determining a segmentation point of a digital processing operation, for a technical effect that can be achieved by the communication apparatus, refer to the foregoing method embodiments. Details are not described herein again.

Figure 20:
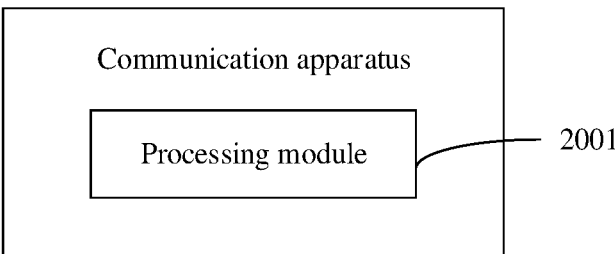
FIG. 20 is a schematic diagram of a structure of another communication apparatus according to an embodiment of this application.

For example, when function modules are obtained through division in an integrated manner, FIG. 20 is a schematic diagram of a structure of a communication apparatus. The communication apparatus may be a controller or a chip or a system-on-a-chip in the controller, or another combined component, part, or the like that can implement the functions of the controller, and the communication apparatus may be configured to perform the functions of the controller in the foregoing embodiments.

In a possible implementation, the communication apparatus shown in FIG. 20 includes a processing module 2001.

The processing module 2001 is configured to obtain a type of a cell corresponding to a first beam of a satellite, where the first beam is any one of a plurality of beams of a satellite, and the type of the cell is determined based on location information of the cell.

The processing module 2001 is further configured to determine, based on the type of the cell, a target segmentation point corresponding to the cell, where the target segmentation point is a target segmentation point of a digital processing operation between the satellite and a terrestrial station.

Figure 21:
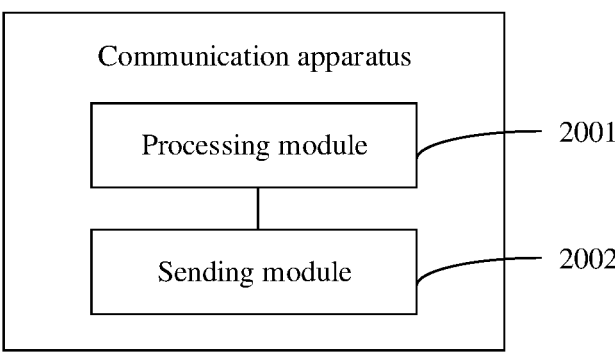
FIG. 21 is a schematic diagram of a structure of another communication apparatus according to an embodiment of this application.

Optionally, as shown in FIG. 21, the communication apparatus further includes a sending module 2002. The sending module 2002 is configured to send information about the target segmentation point to the satellite and the terrestrial station, where the information about the target segmentation point is used to indicate the target segmentation point.

Optionally, the target segmentation point is different from a current segmentation point that is of the digital processing operation between the satellite and the terrestrial station and that is corresponding to the cell. The sending module 2002 is further configured to send a segmentation start message to the satellite and the terrestrial station, where the segmentation start message is used to indicate to change the current segmentation point to the target segmentation point.

Optionally, the sending module 2002 is further configured to send a segmentation execute message to the satellite and the terrestrial station, where the segmentation execute message is used to indicate to process a signal based on the target segmentation point.

All related content of the operations in the foregoing method embodiments may be cited in function descriptions of the corresponding function modules. Details are not described herein again.

In this embodiment, the communication apparatus is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus may use a form shown in FIG. 2.

For example, the processor 201 in FIG. 2 may invoke the computer-executable instructions stored in the memory 203, so that the communication apparatus performs the method for determining a segmentation point of a digital processing operation in the foregoing method embodiments.

For example, a function/implementation process of the processing module 2001 and the sending module 2002 in FIG. 21 may be implemented by the processor 201 in FIG. 2 by invoking the computer-executable instruction stored in the memory 203. Alternatively, a function/implementation process of the processing module 2001 in FIG. 21 may be implemented by the processor 201 in FIG. 2 by invoking the computer-executable instruction stored in the memory 203, and a function/implementation process of the sending module 2002 in FIG. 21 may be implemented by the communication interface 204 in FIG. 2.

Because the communication apparatus provided in this embodiment may perform the foregoing method for determining a segmentation point of a digital processing operation, for a technical effect that can be achieved by the communication apparatus, refer to the foregoing method embodiments. Details are not described herein again.

Figure 22:
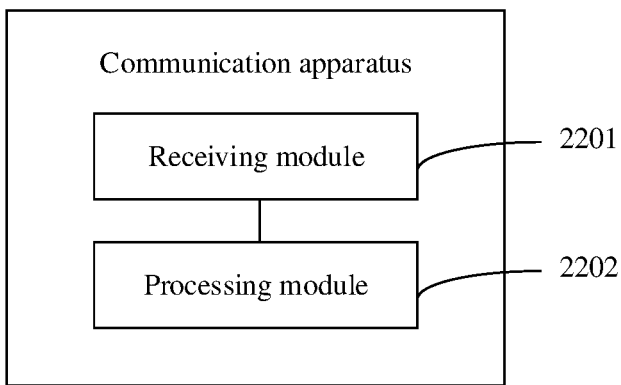
FIG. 22 is a schematic diagram of a structure of another communication apparatus according to an embodiment of this application.

For example, when function modules are obtained through division in an integrated manner, FIG. 22 is a schematic diagram of a structure of a communication apparatus. The communication apparatus may be a satellite or a chip or a system-on-a-chip in the satellite, or another combined component, part, or the like that can implement the functions of the satellite, and the communication apparatus may be configured to perform the functions of the satellite in the foregoing embodiments.

In a possible implementation, the communication apparatus shown in FIG. 22 includes a receiving module 2201 and a processing module 2202.

The receiving module 2201 is configured to receive information about a target segmentation point from a controller, where the information about the target segmentation point is used to indicate a target segmentation point corresponding to a cell, the target segmentation point is a target segmentation point of a digital processing operation between the communication apparatus and a terrestrial station, the cell is a cell corresponding to a first beam, and the first beam is any one of a plurality of beams of the communication apparatus.

The processing module 2202 is configured to determine the target segmentation point based on the information about the target segmentation point.

Optionally, the target segmentation point is different from a current segmentation point that is of the digital processing operation between the communication apparatus and the terrestrial station and that is corresponding to the cell.

The receiving module 2201 is further configured to receive a segmentation start message from the controller, where the segmentation start message is used to indicate to change the current segmentation point to the target segmentation point.

The processing module 2202 is further configured to change the current segmentation point to the target segmentation point.

Optionally, the receiving module 2201 is further configured to receive a segmentation execute message from the controller, where the segmentation execute message is used to indicate to process a signal based on the target segmentation point.

Figure 23:
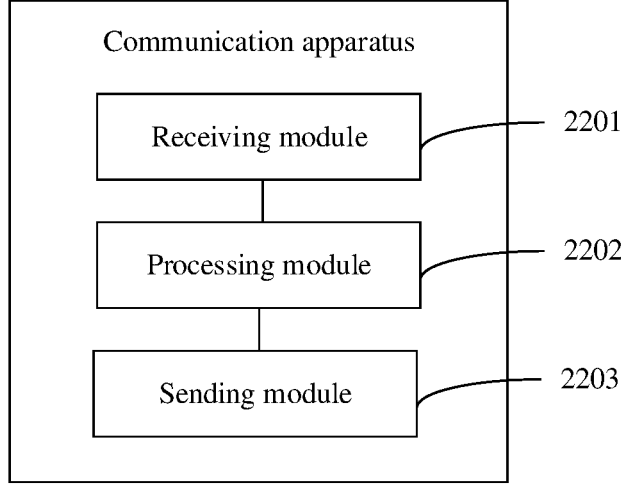
FIG. 23 is a schematic diagram of a structure of another communication apparatus according to an embodiment of this application.

Optionally, as shown in FIG. 23, the communication apparatus further includes a sending module 2203. The type of the cell corresponding to the target segmentation point is a hotspot cell. The receiving module 2201 is further configured to receive measurement information from a terminal, where the terminal is a terminal in the cell, and the measurement information is used to indicate quality of a channel between the communication apparatus and the terminal. The sending module 2203 is configured to send the measurement information to the terrestrial station. The receiving module 2201 is further configured to receive feedback information of the measurement information from the terrestrial station. The processing module 2202 is further configured to communicate with the terminal based on the feedback information of the measurement information.

Optionally, the feedback information of the measurement information is used to adjust the beam corresponding to the cell; or the feedback information of the measurement information is used to schedule a terminal in the cell.

All related content of the operations in the foregoing method embodiments may be cited in function descriptions of the corresponding function modules. Details are not described herein again.

In this embodiment, the communication apparatus is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus may use a form shown in FIG. 2.

For example, the processor 201 in FIG. 2 may invoke the computer-executable instructions stored in the memory 203, so that the communication apparatus performs the method for determining a segmentation point of a digital processing operation in the foregoing method embodiments.

For example, a function/implementation process of the receiving module 2201, the processing module 2202, and the sending module 2203 in FIG. 23 may be implemented by the processor 201 in FIG. 2 by invoking the computer-executable instruction stored in the memory 203. Alternatively, a function/implementation process of the processing module 2202 in FIG. 23 may be implemented by the processor 201 in FIG. 2 by invoking the computer-executable instruction stored in the memory 203, and a function/implementation process of the receiving module 2201 and the sending module 2203 in FIG. 23 may be implemented by the communication interface 204 in FIG. 2.

Because the communication apparatus provided in this embodiment may perform the foregoing method for determining a segmentation point of a digital processing operation, for a technical effect that can be achieved by the communication apparatus, refer to the foregoing method embodiments. Details are not described herein again.

Figure 24:
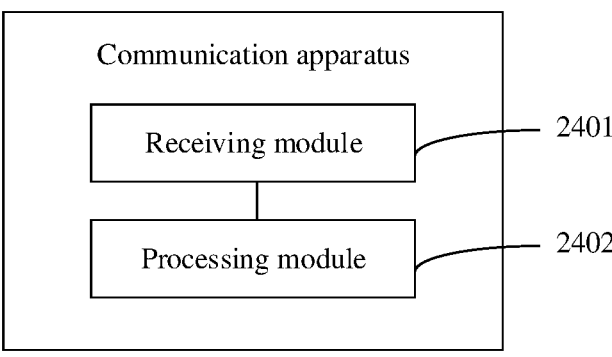
FIG. 24 is a schematic diagram of a structure of another communication apparatus according to an embodiment of this application.

For example, when function modules are obtained through division in an integrated manner, FIG. 24 is a schematic diagram of a structure of a communication apparatus. The communication apparatus may be a terrestrial station or a chip or a system-on-a-chip in the terrestrial station, or another combined component, part, or the like that can implement the functions of the terrestrial station, and the communication apparatus may be configured to perform the functions of the terrestrial station in the foregoing embodiments.

In a possible implementation, the communication apparatus shown in FIG. 24 includes a receiving module 2401 and a processing module 2402.

The receiving module 2401 is configured to receive information about a target segmentation point from a controller, where the information about the target segmentation point is used to indicate a target segmentation point corresponding to a cell, the cell is a cell corresponding to a first beam, the first beam is any one of a plurality of beams of a satellite, and the target segmentation point is a target segmentation point of a digital processing operation between the satellite and the communication apparatus.

The processing module 2402 is configured to determine the target segmentation point based on the information about the target segmentation point.

Optionally, the target segmentation point is different from a current segmentation point that is of the digital processing operation between the satellite and the communication apparatus and that is corresponding to the cell. The receiving module 2401 is further configured to receive a segmentation start message from the controller, where the segmentation start message is used to indicate to change the current segmentation point to the target segmentation point. The processing module 2402 is further configured to change the current segmentation point to the target segmentation point.

Optionally, the receiving module 2401 is further configured to receive a segmentation execute message from the controller, where the segmentation execute message is used to indicate to process a signal based on the target segmentation point.

Figure 25:
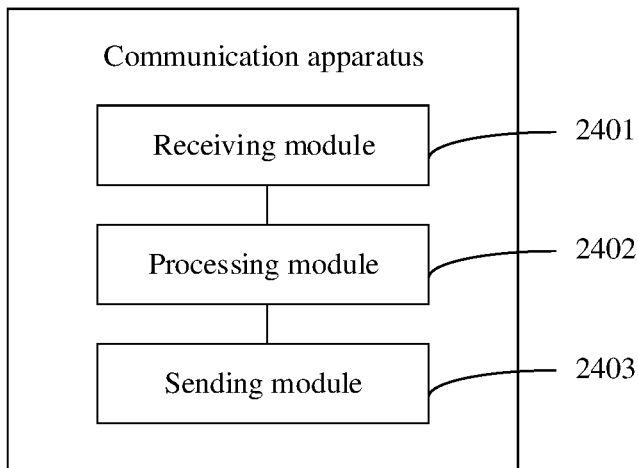
FIG. 25 is a schematic diagram of a structure of another communication apparatus according to an embodiment of this application.

Optionally, as shown in FIG. 25, the communication apparatus further includes a sending module 2403. The type of the cell corresponding to the target segmentation point is a hotspot cell. The receiving module 2401 is further configured to receive measurement information from the satellite, where the measurement information is used to indicate quality of a channel between the satellite and a terminal, and the terminal is a terminal in the cell. The sending module 2403 is configured to send feedback information of the measurement information to the satellite.

Optionally, the feedback information of the measurement information is used to adjust the beam corresponding to the cell; or the feedback information of the measurement information is used to schedule a terminal in the cell.

All related content of the operations in the foregoing method embodiments may be cited in function descriptions of the corresponding function modules. Details are not described herein again.

In this embodiment, the communication apparatus is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the communication apparatus may use a form shown in FIG. 2.

For example, the processor 201 in FIG. 2 may invoke the computer-executable instructions stored in the memory 203, so that the communication apparatus performs the method for determining a segmentation point of a digital processing operation in the foregoing method embodiments.

For example, a function/implementation process of the receiving module 2401, the processing module 2402, and the sending module 2403 in FIG. 25 may be implemented by the processor 201 in FIG. 2 by invoking the computer-executable instruction stored in the memory 203. Alternatively, a function/implementation process of the processing module 2402 in FIG. 25 may be implemented by the processor 201 in FIG. 2 by invoking the computer-executable instruction stored in the memory 203, and a function/implementation process of the receiving module 2401 and the sending module 2403 in FIG. 25 may be implemented by the communication interface 204 in FIG. 2.

Because the communication apparatus provided in this embodiment may perform the foregoing method for determining a segmentation point of a digital processing operation, for a technical effect that can be achieved by the communication apparatus, refer to the foregoing method embodiments. Details are not described herein again.

Figure 26:
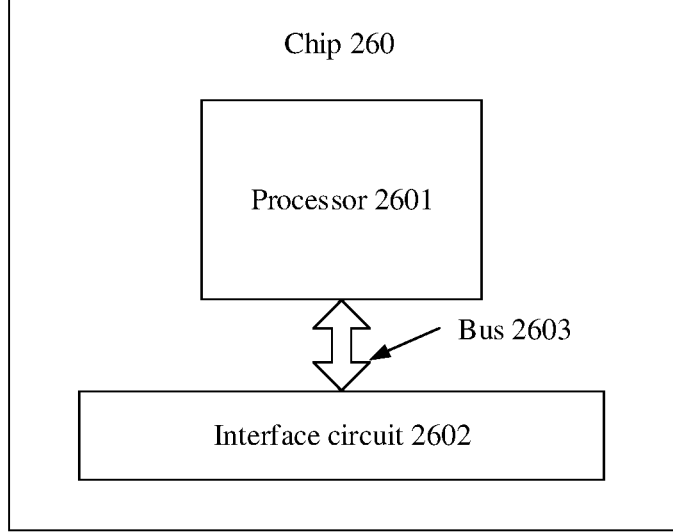
FIG. 26 is a schematic diagram of a structure of a chip according to an embodiment of this application.

FIG. 26 is a schematic diagram of a structure of a chip according to an embodiment of this application. A chip 260 includes one or more processors 2601 and an interface circuit 2602. Optionally, the chip 260 may further include a bus 2603.

The processor 2601 may be an integrated circuit chip and has a signal processing capability. In an implementation process, the steps in the foregoing method may be implemented by using a hardware integrated logical circuit in the processor 2601, or by using instructions in a form of software. The processor 2601 may be a general-purpose processor, a digital signal processor (DSP), an application-specific integrated circuit (ASIC), a field programmable gate array (FPGA) or another programmable logic device, a discrete gate or a transistor logic device, or a discrete hardware component. The methods and steps disclosed in embodiments of this application may be implemented or performed. The general-purpose processor may be a microprocessor, or the processor may be any conventional processor or the like.

The interface circuit 2602 is configured to send or receive data, an instruction, or information. The processor 2601 may perform processing by using the data, the instruction, or other information received by the interface circuit 2602, and may send processing complete information through the interface circuit 2602.

Optionally, the chip 260 further includes a memory. The memory may include a read-only memory and a random access memory, and provides an operation instruction and data for the processor. A part of the memory may further include a non-volatile random access memory (NVRAM).

Optionally, the memory stores an executable software module or a data structure. The processor 2601 may perform a corresponding operation by invoking an operation instruction stored in the memory (the operation instruction may be stored in an operating system).

Optionally, the chip 260 may be used in the communication apparatus in embodiments of this application. Optionally, the interface circuit 2602 may be configured to output an execution result of the processor 2601. For the method for determining a segmentation point of a digital processing operation provided in one or more embodiments of this application, refer to the foregoing embodiments. Details are not described herein again.

It should be noted that functions corresponding to the processor 2601 and the interface circuit 2602 may be implemented through a hardware design, may be implemented through a software design, or may be implemented in a combination of software and hardware. This is not limited herein.

Figure 27:
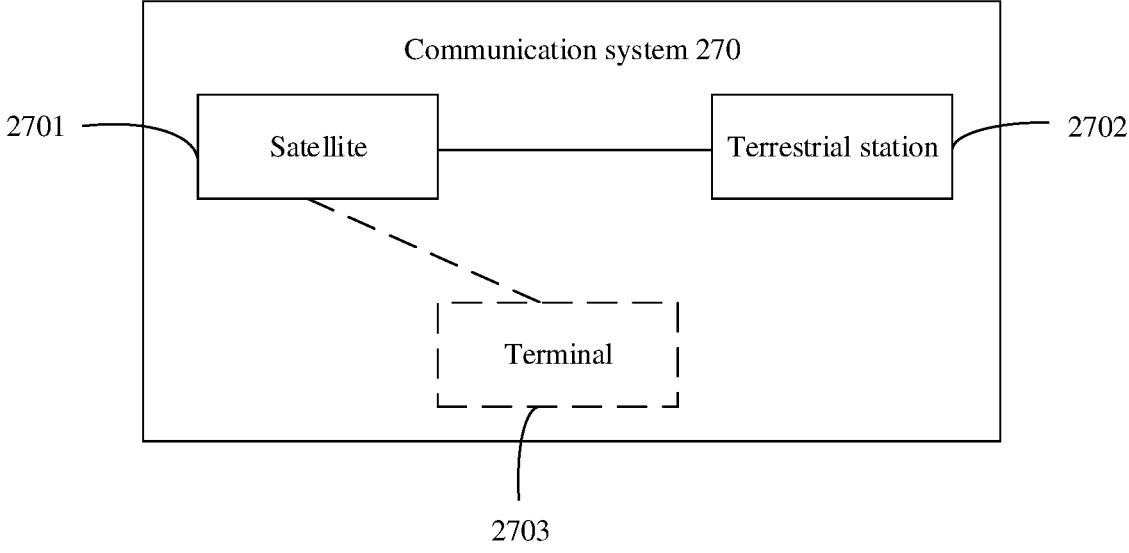
FIG. 27 is a schematic diagram of composition of a communication system according to an embodiment of this application.

FIG. 27 is a schematic diagram of composition of a communication system. As shown in FIG. 27, a communication system 270 may include a satellite 2701 and a terrestrial station 2702. It should be noted that FIG. 27 is only an example of the accompanying drawings, and a network element included in the communication system 270 shown in FIG. 27 and a quantity of network elements are not limited in this embodiment of this application.

The satellite 2701 has a function of the communication apparatus shown in FIG. 15, FIG. 16, or FIG. 17, and may be configured to: obtain a type of a cell corresponding to a first beam, and determine, based on the type of the cell, a target segmentation point corresponding to the cell. Optionally, the satellite 2701 sends information about the target segmentation point to the terrestrial station 2702.

The terrestrial station 2702 has a function of the communication apparatus shown in FIG. 18 or FIG. 19, and may receive the information about the target segmentation point from the satellite 2701, and determine, based on the information about the target segmentation point, a target segmentation point that is of a digital processing operation between the satellite 2701 and the terrestrial station 2702 and that is corresponding to the cell corresponding to the first beam.

Optionally, the communication system 270 further includes a terminal 2703.

The terminal 2703 may be configured to send measurement information to the satellite 2701.

It should be noted that, for all related content of the steps in the foregoing method embodiments, refer to function descriptions of corresponding network elements in the communication system 270. Details are not described herein again.

Figure 28:
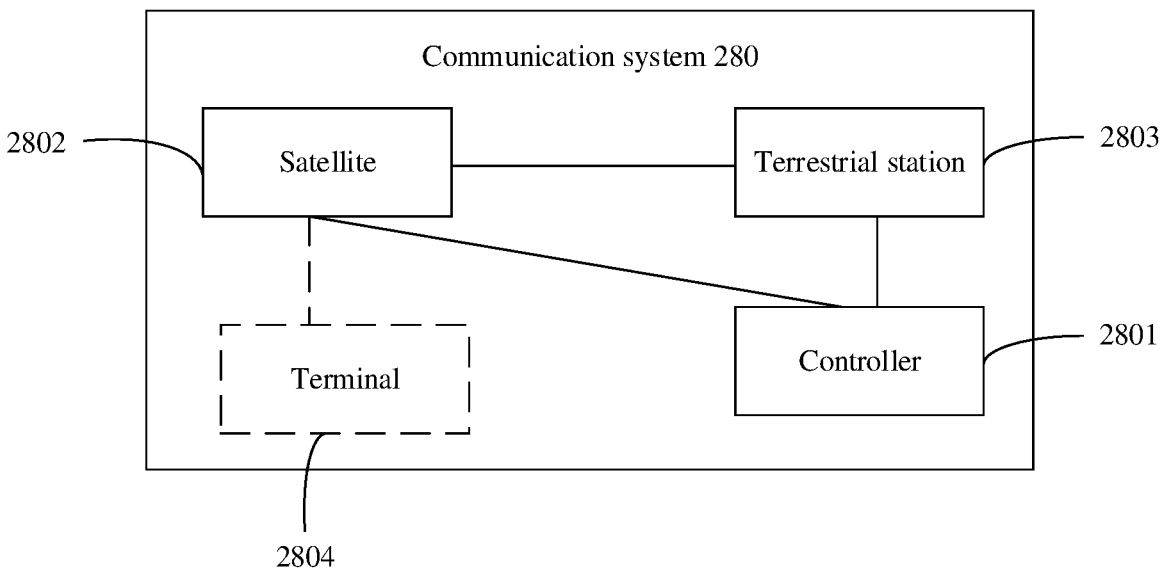
FIG. 28 is a schematic diagram of composition of another communication system according to an embodiment of this application.

FIG. 28 is a schematic diagram of composition of a communication system. As shown in FIG. 28, a communication system 280 may include a controller 2801, a satellite 2802, and a terrestrial station 2803. It should be noted that FIG. 28 is only an example of the accompanying drawings, and a network element included in the communication system 280 shown in FIG. 28 and a quantity of network elements are not limited in this embodiment of this application.

The controller 2801 has a function of the communication apparatus shown in FIG. 20 or FIG. 21, and may be configured to: obtain a type of a cell corresponding to a first beam of the satellite 2802, and determine, based on the type of the cell, a target segmentation point corresponding to the cell. Optionally, the controller 2801 sends information about the target segmentation point to the satellite 2802 and the terrestrial station 2803.

The satellite 2802 has a function of the communication apparatus shown in FIG. 22 or FIG. 23, and may receive the information about the target segmentation point from the controller 2801, and determine, based on the information about the target segmentation point, a target segmentation point that is of a digital processing operation between the satellite 2802 and the terrestrial station 2803 and that is corresponding to the cell corresponding to the first beam.

The terrestrial station 2803 has a function of the communication apparatus shown in FIG. 24 or FIG. 25, and may receive the information about the target segmentation point from the controller 2801, and determine, based on the information about the target segmentation point, the target segmentation point corresponding to the cell corresponding to the first beam.

Optionally, the communication system 280 further includes a terminal 2804.

The terminal 2804 may be configured to send measurement information to the satellite 2802.

It should be noted that, for all related content of the steps in the foregoing method embodiments, refer to function descriptions of corresponding network elements in the communication system 280. Details are not described herein again.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another operation, and "a" or "one" does not exclude a case of "a plurality of". A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example description of this application defined by the appended claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method, comprising:
   obtaining, by a first apparatus, a type of a cell corresponding to a first beam, wherein the first beam is a beam of a plurality of beams of a satellite, the type of the cell is determined based on location information of the cell, and a mobile satellite communication system comprises the first apparatus and a second apparatus, and wherein the first apparatus is a satellite and the second apparatus is a terrestrial station, or the first apparatus is a terrestrial station and the second apparatus is a satellite; and
   determining, by the first apparatus based on the type of the cell, a target segmentation point corresponding to the cell, wherein the target segmentation point is a target segmentation point of a digital processing operation between the first apparatus and the second apparatus.

2. The method according to claim 1, further comprising:
   sending, by the first apparatus, information about the target segmentation point to the second apparatus, wherein the information about the target segmentation point indicates the target segmentation point.

3. The method according to claim 1, wherein the target segmentation point is different from a current segmentation point that is of the digital processing operation between the first apparatus and the second apparatus and that is corresponding to the cell, and the method further comprises:
   changing, by the first apparatus, the current segmentation point to the target segmentation point;
   sending, by the first apparatus, a first complete message to the second apparatus, wherein the first complete message indicates that the first apparatus has changed the current segmentation point to the target segmentation point; and receiving, by the first apparatus, a second complete message from the second apparatus, wherein the second complete message indicates that the second apparatus has changed the current segmentation point to the target segmentation point.

4. The method according to claim 1, wherein the type of the cell comprises an Internet of Things (IoT) cell, a high-speed cell, an access point cell, or a hotspot cell.

5. The method according to claim 1, wherein the first apparatus is a satellite, the second apparatus is a terrestrial station, the cell is a hotspot cell, and the method further comprises:
   receiving, by the first apparatus, measurement information from a terminal, wherein the terminal is a terminal in the cell, and the measurement information indicates a quality of a channel between the first apparatus and the terminal;
   sending, by the first apparatus, the measurement information to the second apparatus;
   receiving, by the first apparatus, feedback information of the measurement information from the second apparatus; and
   communicating by the first apparatus with the terminal based on the feedback information of the measurement information.

6. The method according to claim 5, wherein:
   the feedback information of the measurement information is used to adjust the first beam.

7. The method according to claim 5, wherein:
   the feedback information of the measurement information is used to schedule the terminal in the cell.

8. A first apparatus, comprising:
   at least one processor; and
   a non-transitory computer readable storage medium storing a program that is executable by the at least one processor, the program including instructions to:
      obtain a type of a cell corresponding to a first beam of a satellite, wherein the first beam is a beam of a plurality of beams of the satellite, the type of the cell is determined based on location information of the cell, the first apparatus is comprised in a mobile satellite communication system, and the mobile satellite communication system comprises the first apparatus and a second apparatus, and wherein the first apparatus is a satellite and the second apparatus is a terrestrial station, or the first apparatus is a terrestrial station and the second apparatus is a satellite; and
      determine, based on the type of the cell, a target segmentation point corresponding to the cell, wherein the target segmentation point is a target segmentation point of a digital processing operation between the first apparatus and the second apparatus.

9. The first apparatus according to claim 8, wherein the program further includes instructions to:
   send information about the target segmentation point to the second apparatus, wherein the information about the target segmentation point indicates the target segmentation point.

10. The first apparatus according to claim 8, wherein the target segmentation point is different from a current segmentation point of the digital processing operation between the first apparatus and the second apparatus corresponding to the cell, and wherein the program further includes instructions to:
   change the current segmentation point to the target segmentation point;

send a first complete message to the second apparatus, wherein the first complete message indicates that the first apparatus has changed the current segmentation point to the target segmentation point; and receive a second complete message from the second apparatus, wherein the second complete message indicates that the second apparatus has changed the current segmentation point to the target segmentation point.

11. The first apparatus according to claim 8, wherein the type of the cell comprises: an Internet of Things (IoT) cell, a high-speed cell, an access point cell, or a hotspot cell.

12. The first apparatus according to claim 8, wherein the first apparatus is a satellite, the second apparatus is a terrestrial station, the cell type is a hotspot cell, and the program further includes instructions to:

receive measurement information from a terminal, wherein the terminal is a terminal in the cell, and the measurement information indicates a quality of a channel between the first apparatus and the terminal;

send the measurement information to the second apparatus;

receive feedback information of the measurement information from the second apparatus; and communicate with the terminal based on the feedback information of the measurement information.

13. The first apparatus according to claim 12, wherein: the feedback information of the measurement information is used to adjust the first beam.

14. The first apparatus according to claim 12, wherein: the feedback information of the measurement information is used to schedule the terminal in the cell.

15. A communication system, comprising:

a first apparatus; and a second apparatus, wherein the first apparatus is a satellite and the second apparatus is a terrestrial station, or the first apparatus is a terrestrial station and the second apparatus is a satellite;

wherein the first apparatus is configured to:

obtain a type of a cell corresponding to a first beam of a satellite, wherein the first beam is a beam of a plurality of beams of the satellite, the type of the cell is determined based on location information of the cell; and determine, based on the type of the cell, a target segmentation point corresponding to the cell, wherein the target segmentation point is a target segmentation point of a digital processing operation between the first apparatus and the second apparatus; and wherein the second apparatus is configured to:

receive information about the target segmentation point from the first apparatus; and determine the target segmentation point based on the information about the target segmentation point.

16. The communication system according to claim 15, wherein the target segmentation point is different from a current segmentation point of the digital processing operation between the first apparatus and the second apparatus corresponding to the cell, and the second apparatus is further configured to:

change the current segmentation point to the target segmentation point;

receive a first complete message from the first apparatus, wherein the first complete message indicates that the first apparatus has changed the current segmentation point to the target segmentation point; and send a second complete message to the first apparatus, wherein the second complete message indicates that the second apparatus has changed the current segmentation point to the target segmentation point.

17. The communication system according to claim 15, wherein the type of the cell comprises an Internet of Things (IoT) cell, a high-speed cell, an access point cell, or a hotspot cell.

18. The communication system according to claim 15, wherein the first apparatus is a satellite, the second apparatus is a terrestrial station, and the cell is a hotspot cell, and wherein the second apparatus is further configured to:

receive measurement information from the first apparatus, wherein the measurement information indicates quality of a channel between the first apparatus and a terminal, and the terminal is a terminal in the cell; and send feedback information of the measurement information to the first apparatus based on the measurement information.

19. The second apparatus according to claim 18, wherein: the feedback information of the measurement information is used to adjust the first beam.

20. The second apparatus according to claim 18, wherein: the feedback information of the measurement information is used to schedule the terminal in the cell.

\* \* \* \* \*